United States Patent
David et al.

(10) Patent No.: US 11,579,783 B1
(45) Date of Patent: Feb. 14, 2023

(54) MULTI-TENANT STORAGE

(71) Applicant: VIM INC., San Francisco, CA (US)

(72) Inventors: Asaf David, Tel Aviv (IL); Nicolas Mendzylewski, Tel Aviv (IL); Moran Shemesh, Tel Aviv (IL); Chen Rozenes, Tel Aviv (IL)

(73) Assignee: VIM INC., San Francisco, CA (US)

( * ) Notice: Subject to any disclaimer, the term of this patent is extended or adjusted under 35 U.S.C. 154(b) by 0 days.

(21) Appl. No.: 17/690,710

(22) Filed: Mar. 9, 2022

(51) Int. Cl.
*G06F 21/60* (2013.01)
*G06F 3/06* (2006.01)
*H04L 9/30* (2006.01)

(52) U.S. Cl.
CPC .......... *G06F 3/0623* (2013.01); *G06F 3/0655* (2013.01); *G06F 3/0679* (2013.01); *G06F 21/602* (2013.01); *G06F 21/606* (2013.01); *H04L 9/30* (2013.01)

(58) Field of Classification Search
CPC .... G06F 3/0623; G06F 3/0655; G06F 3/0679; G06F 21/602; G06F 21/606; H04L 9/30
See application file for complete search history.

(56) References Cited

U.S. PATENT DOCUMENTS

| | | | | |
|---|---|---|---|---|
| 10,326,744 | B1 * | 6/2019 | Nossik | H04L 63/0435 |
| 11,387,986 | B1 * | 7/2022 | Ghetti | H04L 63/04 |
| 2019/0372766 | A1 * | 12/2019 | Bahrenburg | G06F 21/6272 |
| 2020/0127981 | A1 * | 4/2020 | Yang | H04L 63/068 |
| 2022/0019367 | A1 * | 1/2022 | Freilich | G06F 3/067 |
| 2022/0021524 | A1 * | 1/2022 | Peddada | H04L 9/3066 |
| 2022/0021525 | A1 * | 1/2022 | Peddada | H04L 9/0838 |
| 2022/0067193 | A1 * | 3/2022 | Singh | G06F 21/602 |
| 2022/0067221 | A1 * | 3/2022 | Schiattarella | G06F 21/602 |
| 2022/0100583 | A1 * | 3/2022 | Lal | G06F 9/5083 |
| 2022/0103593 | A1 * | 3/2022 | Singh | H04L 63/0245 |
| 2022/0166764 | A1 * | 5/2022 | Bahrenburg | H04L 63/126 |
| 2022/0171883 | A1 * | 6/2022 | Bursell | H04L 9/0819 |
| 2022/0182233 | A1 * | 6/2022 | Sofia | H04L 9/0897 |
| 2022/0191019 | A1 * | 6/2022 | Jaquette | H04L 9/0861 |
| 2022/0200801 | A1 * | 6/2022 | Potlapally | H04L 9/0897 |
| 2022/0206958 | A1 * | 6/2022 | LeMay | G06F 12/1466 |
| 2022/0207155 | A1 * | 6/2022 | Chhabra | G06F 21/6227 |
| 2022/0207191 | A1 * | 6/2022 | Hetzler | G06F 21/602 |
| 2022/0207194 | A1 * | 6/2022 | Chhabra | G06F 21/572 |
| 2022/0210139 | A1 * | 6/2022 | Hetzler | H04L 9/14 |
| 2022/0210643 | A1 * | 6/2022 | Hynds | G06F 21/32 |

* cited by examiner

*Primary Examiner* — Joseph P Hirl
*Assistant Examiner* — Stephen T Gundry
(74) *Attorney, Agent, or Firm* — Myers Wolin, LLC

(57) ABSTRACT

A system, apparatus and product comprising: a multi-tenant layer that comprises shared resources, wherein the shared resources are accessible to multiple tenants of the storage system, wherein the shared resources comprise shared logic resources and shared data resources; and multiple single-tenant layers, wherein each single-tenant layer is associated with a respective tenant of the multiple tenants, wherein each single-tenant layer comprises a database and business logic of the respective tenant, wherein a multi-tenant encryption scheme is configured to enable secure communications with the multiple tenants without divulging sensitive information to the multi-tenant layer.

20 Claims, 4 Drawing Sheets

MULTI-TENANT STORAGE

TECHNICAL FIELD

The present disclosure relates to software storage in general, and to multi-tenant software storage, in particular.

BACKGROUND

In some exemplary embodiments, various entities such as a payer entity, a covered entity, a provider entity, or the like, may own or retain respective data repositories with user records, metadata, service data, scheduling data, or any other data records. In some exemplary embodiments, a database of an entity may be used to operate an Electronic Health Record (EHR) system that may be associated to the entity. For example, a provider entity may comprise clinics that utilize an EHR system in order to enable patients of the clinics and medical workers to book appointments, obtain medical records of patients, or the like.

In some exemplary embodiments, EHR systems, also referred to as Electronic Medical Records (EMRs), may comprise records of medical data of a patient in a digital version. An EHR may include Protected Health Information (PHI) such as the medical and treatment histories of patients. Under the US law, PHI information may comprise any information about health status, provision of health care, or payment for health care that is created or collected by a covered entity (or a business associate of a covered entity), and can be linked to a specific individual. This may be interpreted broadly to include any part of a patient's medical record or payment history.

BRIEF SUMMARY

One exemplary embodiment of the disclosed subject matter is a software storage system comprising: a multi-tenant layer that comprises shared resources, wherein the shared resources are accessible to multiple tenants of the storage system, wherein the shared resources comprise shared logic resources and shared data resources; and multiple single-tenant layers, wherein each single-tenant layer is associated with a respective tenant of the multiple tenants, wherein each single-tenant layer comprises a database and business logic of the respective tenant; wherein a multi-tenant encryption scheme is configured to enable secure communications with the multiple tenants without divulging sensitive information to the multi-tenant layer, wherein a secure communication comprises: obtaining, at the multi-tenant layer, an encrypted input to be provided to a tenant, wherein the encrypted input is encrypted with a public key of the tenant, providing the encrypted input to the tenant, decrypting, at the tenant, the encrypted input using a private key of the tenant, thereby obtaining the input, processing, at the tenant, the input, thereby obtaining a result, encrypting, at the tenant, the result with a public key of the tenant, thereby obtaining an encrypted result, providing the encrypted result, via the multi-tenant layer, to a destination entity, in response to an encryption replacement request from the destination entity, decrypting the encrypted result, at the tenant, using the private key of the tenant, and re-encrypting the result with a public key of the destination entity, thereby obtaining a re-encrypted result, and providing the re-encrypted result to the destination entity, whereby the multi-tenant layer has no access to the input and to the result.

Optionally, the destination entity is a second tenant of the multiple tenants, wherein the input is a user input of a user provided via a client device, wherein a first data record about the user is retained in the database of the tenant and a second data record about the user is retained in the database of the second tenant, wherein said processing the input at the tenant comprises the tenant retrieving the first data record from the database of the tenant, wherein the second tenant is configured to issue the encryption replacement request to the tenant with the encrypted result, thereby enabling the tenant to perform said re-encrypting without relying on a local storage of the tenant, wherein the second tenant is further configured to: decrypt the re-encrypted result using a private key of the second tenant, thereby obtaining the result; retrieve the second data record from the database of the second tenant; process the result with the second data record to determine a second result; and provide the second result to the multi-tenant layer, to be provided to a client of the user, enabling the client to utilize the second result to provide a display to the user.

Optionally, the secure communication comprises: obtaining, at the multi-tenant layer, a request from a user requesting the public key of the tenant, providing, at the multi-tenant layer, the public key of the tenant to the user, and encrypting, at the user, the input with the public key of the tenant, thereby obtaining the encrypted input.

Optionally, the secure communication comprises: obtaining, at the multi-tenant layer, non-encrypted data in addition to the encrypted input, wherein the non-encrypted data comprises non-sensitive data, processing, at the multi-tenant layer, the non-encrypted data based on the shared logic resources and the shared data resources, thereby obtaining a non-encrypted result, and providing, at the multi-tenant layer, the non-encrypted result to a user.

Optionally, the secure communication comprises: obtaining, at the multi-tenant layer, non-encrypted data in addition to the encrypted input, wherein the non-encrypted data comprises non-sensitive data, processing, at the multi-tenant layer, the non-encrypted data based on the shared logic resources and the shared data resources, thereby obtaining a non-encrypted result, and providing, at the multi-tenant layer, the non-encrypted result to a second tenant of the multiple tenants.

Optionally, the secure communication comprises: obtaining, at the multi-tenant layer, non-encrypted data in addition to the encrypted input, wherein the non-encrypted data comprises non-sensitive data, providing the non-encrypted data to the tenant, in addition to the encrypted input, processing, at the tenant, the non-encrypted data, thereby obtaining a non-encrypted result, and providing, at the tenant, the non-encrypted result to the multi-tenant layer.

Optionally, said re-encrypting is performed based on a determination of the tenant that the destination entity has permission to access the result.

Optionally, the destination entity comprises a second tenant, whereby the second tenant is enabled to decrypt the re-encrypted result using a private key of the second tenant.

Optionally, the destination entity comprises the user, whereby the user is enabled to decrypt the re-encrypted result using a private key of the user.

Optionally, the multiple single-tenant layers comprise respective namespaces that are contained within the multi-tenant layer.

Optionally, the multiple tenants comprise respective Electronic Health Record (EHR) systems.

Optionally, the multiple tenants comprise a first tenant and a second tenant, wherein the first tenant complies with a first security or privacy restriction and wherein the second tenant complies with a second security or privacy restriction.

Optionally, the first security or privacy restriction is contradictory to the second security or privacy restriction.

Another exemplary embodiment of the disclosed subject matter is an apparatus comprising a processor and coupled memory, said processor being adapted to implement a multi-tenant encryption scheme, wherein the multi-tenant encryption scheme is configured to enable secure communications with multiple tenants of a software storage system without divulging sensitive information to a multi-tenant layer of the storage system, wherein the processor is adapted to: obtain, at the multi-tenant layer, an encrypted input to be provided to a tenant, wherein the encrypted input is encrypted with a public key of the tenant, wherein the multi-tenant layer comprises shared resources, wherein the shared resources are accessible to the multiple tenants of the storage system, wherein the shared resources comprise shared logic resources and shared data resources; provide the encrypted input to the tenant, wherein the tenant comprises a single-tenant layer of multiple single-tenant layers of the storage system, wherein each single-tenant layer is associated with a respective tenant of the multiple tenants, wherein each single-tenant layer comprises a database and business logic of the respective tenant; decrypt, at the tenant, the encrypted input using a private key of the tenant, thereby obtaining the input; process, at the tenant, the input, thereby obtaining a result; encrypt, at the tenant, the result with a public key of the tenant, thereby obtaining an encrypted result; provide the encrypted result, via the multi-tenant layer, to a destination entity; in response to an encryption replacement request from the destination entity, decrypt the encrypted result, at the tenant, using the private key of the tenant, and re-encrypt the result with a public key of the destination entity, thereby obtaining a re-encrypted result; and provide the re-encrypted result to the destination entity, whereby the multi-tenant layer has no access to the input and to the result.

Yet another exemplary embodiment of the disclosed subject matter is a computer program product comprising a non-transitory computer readable medium retaining program instructions, which program instructions when read by a processor, cause the processor to implement a multi-tenant encryption scheme, wherein the multi-tenant encryption scheme is configured to enable secure communications with multiple tenants of a software storage system without divulging sensitive information to a multi-tenant layer of the storage system, wherein the program instructions, when executed by the processor, cause the processor to: obtain, at the multi-tenant layer, an encrypted input to be provided to a tenant, wherein the encrypted input is encrypted with a public key of the tenant, wherein the multi-tenant layer comprises shared resources, wherein the shared resources are accessible to the multiple tenants of the storage system, wherein the shared resources comprise shared logic resources and shared data resources; provide the encrypted input to the tenant, wherein the tenant comprises a single-tenant layer of multiple single-tenant layers of the storage system, wherein each single-tenant layer is associated with a respective tenant of the multiple tenants, wherein each single-tenant layer comprises a database and business logic of the respective tenant; decrypt, at the tenant, the encrypted input using a private key of the tenant, thereby obtaining the input; process, at the tenant, the input, thereby obtaining a result; encrypt, at the tenant, the result with a public key of the tenant, thereby obtaining an encrypted result; provide the encrypted result, via the multi-tenant layer, to a destination entity; in response to an encryption replacement request from the destination entity, decrypt the encrypted result, at the tenant, using the private key of the tenant, and re-encrypt the result with a public key of the destination entity, thereby obtaining a re-encrypted result; and provide the re-encrypted result to the destination entity, whereby the multi-tenant layer has no access to the input and to the result.

Yet another exemplary embodiment of the disclosed subject matter is a method of performing a multi-tenant encryption scheme, wherein the multi-tenant encryption scheme is configured to enable secure communications with multiple tenants of a software storage system without divulging sensitive information to a multi-tenant layer of the storage system, wherein the method comprises: obtaining, at the multi-tenant layer, an encrypted input to be provided to a tenant, wherein the encrypted input is encrypted with a public key of the tenant, wherein the multi-tenant layer comprises shared resources, wherein the shared resources are accessible to the multiple tenants of the storage system, wherein the shared resources comprise shared logic resources and shared data resources; providing the encrypted input to the tenant, wherein the tenant comprises a single-tenant layer of multiple single-tenant layers of the storage system, wherein each single-tenant layer is associated with a respective tenant of the multiple tenants, wherein each single-tenant layer comprises a database and business logic of the respective tenant; decrypting, at the tenant, the encrypted input using a private key of the tenant, thereby obtaining the input; processing, at the tenant, the input, thereby obtaining a result; encrypting, at the tenant, the result with a public key of the tenant, thereby obtaining an encrypted result; providing the encrypted result, via the multi-tenant layer, to a destination entity; in response to an encryption replacement request from the destination entity, decrypting the encrypted result, at the tenant, using the private key of the tenant, and re-encrypting the result with a public key of the destination entity, thereby obtaining a re-encrypted result; and providing the re-encrypted result to the destination entity, whereby the multi-tenant layer has no access to the input and to the result.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
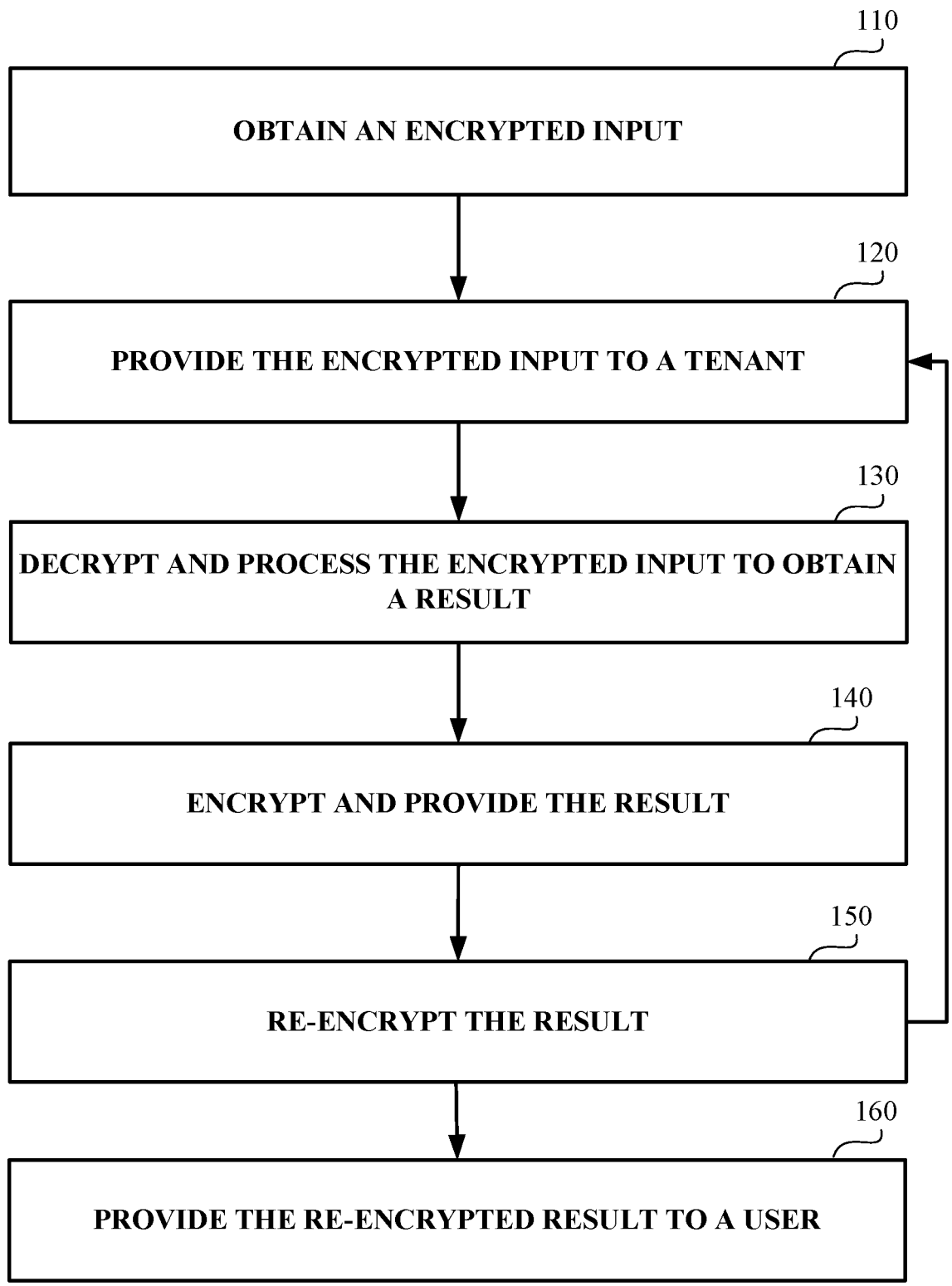
FIG. 1 illustrates a flowchart diagram of a method, in accordance with some exemplary embodiments of the disclosed subject matter.

One technical problem dealt with by the disclosed subject matter is retaining data from multiple unassociated entities in a shared associated storage. In some exemplary embodiments, various entities such as a payer entity, a covered entity, a provider entity, or the like, may own or retain respective data repositories storing user records, metadata, service data, scheduling data, or any other data records, files, or the like. In some exemplary embodiments, a database of an entity may be used to operate one or more systems such as Electronic Health Record (EHR) systems of the entity. For example, a provider entity may comprise medical clinics that utilize an EHR system to enable patients of the clinics and medical workers to book appointments, obtain medical records of patients, or the like. According to this example, the database of the provider entity may function as part of the backend of the EHR system.

In some exemplary embodiments, EHRs, also referred to as Electronic Medical Records (EMRs), may comprise records of medical data of a patient in a digital version. In some exemplary embodiments, an EHR system may comprise the medical and treatment histories of patients, financial data of the patient, health insurance plans, user feedback, demographic data, credentials to the EHR system such as user names and respective passwords, other account information, or the like. In some exemplary embodiments, an EHR may be accessed via various EHR software systems such as desktop applications, websites, web-based applications, or the like.

In some exemplary embodiments, EHR systems may be accessed by providers, payers, or the like, such as on behalf of one or more patients. In some exemplary embodiments, EHR systems may be used by various actors or entities such as a payer entity, a covered entity, or the like. In some exemplary embodiments, a payer entity may comprise a health insurance entity, an entity that assumes the risk of paying for medical treatments, an entity that covers at least partial costs of medical treatments, or the like. In some exemplary embodiments, EHR systems may be used by a provider entity such as doctors, Primary Care Physicians (PCPs), clinics, or the like, e.g., which may be supported or covered by one or more payers. In some exemplary embodiments, EHR systems may be used by a covered entity such as an entity that provides treatment, payment and operations in healthcare such as a doctor's office, dental offices, clinics, psychologists, nursing homes, pharmacies, hospitals or home healthcare agencies, health plans, insurance companies, Health Maintenance Organizations (HMOs), or the like. It is noted that for the purpose of the present application, an EHR system may comprise any system that retains electronic medical records or relates to the treatment or coverage of patients. This includes also the systems used by the payer entities, which may not traditionally be referred to as EHRs, but who retain information relating to the coverage of patients and relate to the patient's medical treatment options.

In some exemplary embodiments, separate and unassociated EHR systems may be used by different providers, payers, covered entities, or the like, although the retained data may in some cases overlap. In some cases, different EHR systems may retain different or same data records of a same patient. For example, a payer web portal belonging to a payer entity may comprise records of a patient, while an EHR system of a provider may retain records of the same patient with overlapping and/or different information. In some cases, a same EHR system may be used by one or more clinics, or other payer and/or provider entities. In some exemplary embodiments, separate EHR systems may retain data that is not synchronized with other EHR systems, does not cooperate therewith, or the like, such as regarding a same subject. For example, a first clinic may use a first EHR system that is not synchronized and has no access to a second EHR system of a second clinic.

In some exemplary embodiments, an extending service may be configured to enhances functionalities and augmented data of a rendered page of an EHR system, such as by loading one or more extending applications over the EHR page. In some cases, the page of the EHR system may be rendered by a web browser, a desktop application, or the like. For example, a user may utilize a user interface of an EHR system in order to perform actions on behalf of a patient, such as scheduling a treatment. In some exemplary embodiments, the browsed page may be associated with an EHR system that may retain a database with data records of one or more patients. In some exemplary embodiments, in addition to the EHR system, a plurality of other EHR systems that are separate from each other may retain other records of overlapping users, e.g., with different or overlapping user information. In some exemplary embodiments, the extending service may utilize a software agent such as a browser extension, a desktop agent, or the like, in order to extend a Graphical User Interface (UI) (GUI) of an EHR system with extending applications such as additional data, functionalities, or the like, that are not available in the underlying EHR system but can be obtained or derived from data retained at different EHR systems. In some cases, it may be desired to push additional content to a browsed EHR page, load additional resources thereto, or the like. For example, it may be desired to load in a rendered EHR page additional physicians that are not listed at the current EHR system. In some exemplary embodiments, a software agent of an extending service may extend a functionality or content of a browsed page, e.g., by pushing additional content to the page, loading resources thereto, or the like, based on data sources of other EHR systems. For example, the extending service may be configured to add a list of providers over a UI of a first EHR system, where the list is derived from a storage of a second EHR system.

In some exemplary embodiments, in order to facilitate the functionality of the extending service, it may be necessary to provide a shared platform retaining data from backends of the EHR system (referred to as "an extending storage"). In some exemplary embodiments, providing a shared extending storage may enable the extending service to accumulate data from multiple EHR systems, and utilize the data for determining and generating extending applications over any EHR system that is used by a user.

In some exemplary embodiments, it may be challenging to generate a shared extending storage, at least due to one or more constraints on sharing data of an EHR system. In some exemplary embodiments, an EHR system may have an independent backend data center with at least one database or repository that comprises sensitive medical data, such as Protected Health Information (PHI) data. In some exemplary embodiments, PHI information may comprise data about a health status, provision of health care, payment for health care, or the like, that is created or collected by a covered entity, and can be linked to a specific individual. In some exemplary embodiments, government regulations, privacy treaties, privacy concerns, or the like, may impose one or more restrictions or constraints on sharing PHI information. In some exemplary embodiments, EHR systems that retain PHI information may be restricted by government regulations or protocols, such as the Fast Healthcare Interoperability Resources (FHIR) standard created by the Health Level Seven International (HL7) health-care standards organization, which comprises a permitted Application Programming Interface (API) for exchanging EHR records. In some exemplary embodiments, organizations that deal with PHI data may be required to follow defined physical, network, and process security measures in order to ensure compliance with protocols such as the Health Insurance Portability and Accountability Act (HIPAA).

In some exemplary embodiments, additional or alternative constraints on generating the shared extending storage may comprise compliance or contractual requirements of individual EHR systems. In some exemplary embodiments, organizations managing EHR system (e.g., clinics) may have contractual constraints requiring them to use specific privacy configurations, techniques, or the like. In some exemplary embodiments, organizations may desire to utilize selected encryption means or methods, private encryption means, or the like, e.g., in order to verify that privacy regulations are complied with, in order to comply with contractual requirements, in order to comply with market requirements, or the like. In some exemplary embodiments, since data of the EHR systems may comprise PHI information, which may be highly sensitive, storing data from multiple EHR systems or entities in a single database or namespace of the extending service may violate privacy and contractual regulations.

In some exemplary embodiments, an extending storage with accumulated data that originates from the multiple EHR systems may be configured to comply with privacy constraints of multiple EHR systems, which may be challenging. In some exemplary embodiments, various organizations utilizing EHR systems may require the extending storage to use different security or privacy measures, restrictions, protocols, or the like. For example, an EHR system of a certain organization may be required to comply with a security standard such as the SOC 2 standard, which may comprise a trust service criterion, thereby enforcing the security standard over data records from the organization when retained in the extending storage. In some exemplary embodiments, trust service criteria may be used to identify compliance of a company or entity with security regulations. As another example, an EHR system of a certain organization may request the extending storage to utilize existing security measures of the organization, existing cryptographical keys of the organization, or the like. In some exemplary embodiments, it may be desired to provide different security restrictions to different organizations that have data records retained in the extending storage of the extending service.

A naïve solution to storing data of organizations with different security restrictions in a shared storing space may comprise retaining for each EHR system a separate environment, in which all of the EHR system's data can be stored. This approach may have one or more drawbacks, as it may create a connectivity issue between the different EHR systems. For example, each environment may have its own encryption scheme, preventing any cooperation between environments. Additionally, providing a separate environment to each EHR system may be resource consuming, as it may be expensive, storage consuming, and may increase a processing time of the data. For example, responses to requests for data may be processed in increased time for separate storages of each EHR system. In some exemplary embodiments, retaining separate data storages, such as by retaining a separate sub-domain for each EHR system, may not be advantageous, as it may be expensive and difficult to manage. Retaining separate environments for each EHR system may consume a large amount of storage resources, since the number of retained environments for each EHR system may comprise a many-to-many cartesian product of each payer system with each provider system.

In some exemplary embodiments, it may be desired to generate a shared extending storage while complying with the aforesaid constraints and overcoming the associated challenges and drawbacks.

Another technical problem dealt with by the disclosed subject matter is providing an extending storage that enables the extending service to perform a cooperated action that requires data from backends of different EHR systems. In some exemplary embodiments, it may be desired to enable a user browsing an EHR session to perform cooperated activities such as booking an appointment, accessing medical records associated with the user, or the like, that require data or functionalities of different EHR systems such as different payer entities, different provider entities, different covered entities, different EHR systems with a same type of entity, a combination thereof, or the like. For example, cooperation between tenants may be necessary for providing certain microservices such as extracting data, manipulating data, or the like.

Yet another technical problem dealt with by the disclosed subject matter is managing strict privacy requirements of multiple data centers of EHR systems in a single storage space. In some exemplary embodiments, each EHR system may request various privacy requirements such as compliance and contractual regulations to be complied with by the shared extending storage when handling their respective data center. In some exemplary embodiments, the extending storage may be required to adjust security restrictions for different EHR systems.

Yet another technical problem dealt with by the disclosed subject matter is retaining data of different EHR systems in a manner that is not fully segregated. It may be desired to provide an extending storage that does not retain all of the EHR systems' together, without separation, which may violate privacy constraints, while not retaining each EHR system's data in an entirely separate environment or namespace within the storage, which may be resource consuming.

It is noted that the disclosed subject matter is exemplified with relation to different EHR systems, but it is not limited to the medical realm or to EHR systems specifically. As an example, the disclosed subject matter may be applied to any other data-retaining systems. In some exemplary embodiments, the EHR systems that are described herein may comprise any software systems that retain records of sensitive data. For example, the EHR systems may comprise systems for retaining résumés of applicants. Alternatively, the data that is retained at the EHR systems may not relate to a human subject but to any other subject, object, topic, or the like.

One technical solution provided by the disclosed subject matter is providing an extending multi-tenant storage, in which each EHR system or associated organization is represented by a different storage tenancy. In some exemplary embodiments, the extending storage may enable to store data accumulated from data centers of multiple tenants associated with multiple payer entities, provider entities, or the like. In some exemplary embodiments, the extending storage may comprise a shared space, in which non-PHI or non-sensitive data may be stored and shared between tenants, in conjunction with segregated non-shared tenant-specific spaces, which may retain private data of each tenant in a separate environment. In some exemplary embodiments, the multi-tenancy environment that is shared with all tenants may be referred to as the multi-tenant layer, while the single tenancy environments of each tenant may be referred to as single-tenant layers.

In some exemplary embodiments, the extending storage may retain user accounts, data records from payer and provider entities, functionalities of payer and provider entities, metadata regarding providers, metadata regarding covered entities, metadata regarding payers, logged data from user interfaces of EHR systems, general functionalities, or the like, in the multi-tenant layer and/or the single-tenant layers. In some exemplary embodiments, the extending service may accumulate, retain, or obtain EHR-related data from multiple EHR systems over which the extending service may be executed, such as payer systems, provider systems, covered entity systems, or the like. In some exemplary embodiments, the extending storage may be retained at one or more servers or any other computing device that is independent from the EHR systems, such as a backend of the extending service.

In some exemplary embodiments, the multi-tenant layer of the storage may comprise a tenancy environment including data, logic, or the like, that is shared with all tenants. In some exemplary embodiments, the multi-tenant layer may not be configured to comprise or handle sensitive data that is not encrypted, PHI data that is not encrypted, or the like. In some exemplary embodiments, the extending storage may comprise a single tenancy layer per customer, which may allocate for each tenant a separate database, logic and encryption environment that may retain sensitive data of each tenant, private data thereof, non-sensitive data, or the like. In some exemplary embodiments, the extending service may retain, for each payer tenant, provider tenant, or the like, a single-tenant layer retaining data records from the respective system's data center. In some exemplary embodiments, the single-tenant layer may be used to retain data associated to each tenant in respective namespaces, e.g., databases of respective payer or provider entities, while the multi-tenant layer may be used to retain non-sensitive data in a shared namespace. In some exemplary embodiments, the resulting extending storage may be highly segregated, e.g., at least compared to a fully shared environment, as it may include segregated single tenancy environments for each tenant. Nevertheless, the extending storage may not be fully segregated, as it includes the shared multi-tenant layer, which may enable to preserve storage resources of the system and enhance computations, thereby overcoming drawbacks of both fully segregated and fully shared storages.

In some exemplary embodiments, every tenant may be allocated its own separate namespace, defining its single-tenant layer. In some exemplary embodiments, a namespace of a tenant may comprise an encryption key pair of the tenant, the tenant's database, the tenant's business logic processes, other infrastructure of the tenant (e.g., an event bus for events with PHI data), or the like. In some exemplary embodiments, the tenant's database inside its allocated namespace may retain sensitive data, as well as non-sensitive data belonging to the tenant. In some exemplary embodiments, the tenant's processes may comprise one or more actions, applications, functionalities, or the like, which may be configured to manipulate and access data from the tenant's database, e.g., sensitive data, manipulate inputs, and provide a result based thereon. For example, the tenant's processes may comprise actions that can be performed for a user, e.g., booking an appointment. In some exemplary embodiments, the separate namespaces of the tenants using the extending storage may create data "boxes" or data capsules that are separate for each customer, thereby increasing a data security level of the system.

In some exemplary embodiments, the multi-tenant layer may comprise a single instance that retains all the data of the environment, e.g., from all tenants, in separate capsules. In some exemplary embodiments, the namespaces of the tenants may be retained within the multi-tenant layer, without enabling the multi-tenant layer to access the encrypted data of each tenant in their namespace. In some exemplary embodiments, allocating a separate encrypted namespace for each tenant within the multi-tenant layer may enable to restrict access to the tenants' data and processes, preventing other tenants and users to access or utilize the namespace of each tenant without obtaining direct consent of the tenant.

In some exemplary embodiments, in addition to the encrypted namespaces of the tenants, the multi-tenant layer may comprise non-encrypted components, resources databases, logic, functionalities, or the like. In some exemplary embodiments, although each tenant may be allocated a namespace within the multi-tenant layer, one or more non-sensitive services or data may be retained in a shared location within the multi-tenant layer, providing access to all tenants, and enabling utilization of the resources by the multi-tenant layer. In some exemplary embodiments, while the non-sensitive services may be usable and accessible to all tenants and to the multi-tenant layer, private or sensitive services may be accessible only inside a tenant's namespace, and may not be directly usable by other tenants.

In some exemplary embodiments, organizations using EHR systems may require in some cases to use their own security means, keys, or the like, when storing their data. In some cases, security or privacy restrictions of a first organization, represented by a first tenant, may contradict or differ from security or privacy restrictions of a second organization, represented by a second tenant. It may be desired to retain in the extending storage data records from multiple tenants in a secure and privacy preserving manner, while ensuring that privacy regulations of each tenant is kept and complied with. For example, it may be desired to ensure that the extending storage does not provide access to data records of a first organization to any other organization or to unauthorized users in the same organization. In some exemplary embodiments, integrating a self-provided encryption mechanism of a tenant in the extending storage may be complex, at least since each organization may require utilization of a separate encryption mechanism, which may cause data exchanges between different tenants to be challenging. Additionally, as each tenant may be configured to provide multiple microservices, the complexity of integrating the tenants' databases may increase, at least since cooperation between tenants may be necessary for providing certain microservices.

In some exemplary embodiments, the extending storage may address the challenges by enabling every tenant to utilize its own encryption techniques within its namespace, and to use a defined encryption scheme in the shared multi-tenant layer. In some exemplary embodiments, organizations having a tenant in the extending storage may be enabled to provide their own encryption means or methods, which may be implemented independently, by the extending service, or the like. In some exemplary embodiments, the extending storage may enable every tenant to restrict a usage of its data within its namespace according to privacy or contractual regulations of each of the tenants. In some exemplary embodiments, by enabling every tenant to implement its own security methods in its own namespace, the extending storage may comply with various security regulations, standards, and restrictions of retaining data, which may be required to be complied with by tenants. In some exemplary embodiments, when storing data of a tenant, the extending storage may enable the tenant to follow the security restrictions to which the organization that owns the data intends to comply.

In some exemplary embodiments, the multi-tenant layer may function as a secure communication medium between the tenants, between a client and one or more tenants, or the like, by utilizing a multi-tenant encryption scheme or protocol. In some exemplary embodiments, the multi-tenant layer may comprise a general layer that all tenants can access and utilize as a communication platform enabling to communicate between different secure namespaces of tenants, between a client and a tenant, or the like, without divulging sensitive information to the multi-tenant layer. In some exemplary embodiments, a multi-tenant encryption scheme may be utilized by all tenants when sending messages via the multi-tenant layer, in order to prevent unauthorized access to the messages. In some exemplary embodiments, different tenant namespaces may communicate with each other, or with a user, via the multi-tenant layer, such as by communicating encrypted data packets through the multi-tenant layer. In some exemplary embodiments, within each single-tenant layer, any desired security means may be utilized by each respective tenant, and outside of each single-tenant layer, the multi-tenant encryption scheme may be implemented.

In some exemplary embodiments, all PHI data or otherwise sensitive data that is communicated via the multi-tenant layer may be configured to remain encrypted within the multi-tenant layer, so that the data will not be accessible to unauthorized entities. In some exemplary embodiments, sensitive data may comprise sensitive outputs from a tenant namespace, sensitive inputs from a user, or the like, which may all be encrypted, so that the multi-tenant layer will not have access to sensitive data. Accordingly, the sensitive data being transferred between tenants may be transferred by the multi-tenant layer in an encrypted form, e.g., in case of PHI data, sensitive data, non-sensitive data, or the like. In some cases, all data outputs from a tenant's namespace may be encrypted, e.g., regardless of whether or not they are sensitive. In some cases, not all data outputs are to be encrypted. For example, one or more classifiers such as heuristic classifiers or machine learning classifiers may classify data outputs from a tenant's namespace as sensitive or not, enabling the tenant to encrypt sensitive data alone, and not to encrypt non-sensitive data, thereby providing unencrypted outputs in case the outputs are classified as not sensitive. As another example, data may be classified as sensitive or not using dynamic definitions or classifications, and only sensitive data may be encrypted, e.g., in case a probability that the data is sensitive overpasses a threshold. In some exemplary embodiments, data payloads may be generated to include an encryption field indicating whether or not the data in the payload is encrypted, a tenant source of the payload, or the like.

In some exemplary embodiments, the multi-tenant encryption scheme may define a handshake that is configured to facilitate secure communications between tenants with different encryption mechanisms. In some exemplary embodiments, the handshake may be configured to establish a secure communication channel between the single-tenant layers, between a client and a single-tenant layer, or the like, via the multi-tenant layer, thereby enabling tenants to cooperate with each other such as to perform cooperated actions, to compute cooperated functions, or the like. For example, the communication channel may enable an insurance company to cooperate in one or more tasks with a provider clinic. In some exemplary embodiments, the multi-tenant encryption scheme may utilize an End-To-End Encryption (E2EE), or any other encryption technique, in order to facilitate communications between all components and tenants in the extending storage via the multi-tenant layer. In some exemplary embodiments, using an end-to-end encryption when performing a communication session between tenants, between a user and a tenant, or the like, may enable only the communicating parties of the communication session to access and read the communicated message, e.g., using encryption keys, while preventing the multi-tenant layer or entities therein to eavesdrop on the message.

In some exemplary embodiments, a handshake between tenants, as defined by the multi-tenant encryption scheme, may comprise obtaining each other's public keys, and using the public keys in order to encrypt messages to each other and transmit them via the multi-tenant layer. In some exemplary embodiments, each tenant may retain a key pair, including a public key and a private key, that may be configured to be used for encrypting data from their database, encrypting functionality results, communications, metadata, or the like. In some exemplary embodiments, the key pairs may originate from the tenants' systems' backend, from the extending service such as by logic retained in the multi-tenant layer, by the tenant's logic retained in its namespace, or the like. In some exemplary embodiments, during a handshake between first and second tenants, each tenant may provide the other tenant with its own public key, thereby enabling both tenants to encrypt data with the public key of the other tenant, which can only be decrypted by the other tenant. In some exemplary embodiments, the handshake between two tenants may be conducted via the multi-tenant layer, which may forward messages between tenants, instruct a first tenant to re-encrypt its data with an encryption key of a second tenant and provide the re-encrypted data to the second tenant, or the like. In some exemplary embodiments, after the handshake, in case logic or data of a first tenant is requested by a client, by a second tenant, or the like, the requesting party may provide a request message to the first tenant that is encrypted with the public key of the first tenant, and the first tenant may decrypt the message using its private key, and encrypt the resulting data or logic with a public key of the requesting party. In some cases, the first tenant may determine whether or not to enable the requesting party to consume the requesting data, e.g., based on a privacy scheme of the first tenant. For example, the first tenant may accept the request by encrypting the requested data with a public key of the requesting party, or decline the request. In some exemplary embodiments, by enabling each tenant to utilize its selected security mechanism within its namespace, and within the multi-tenant encryption scheme, the extending storage may enable organizations with strict data transfer regulations to share and access sensitive information securely while keeping all compliance and contractual requirements, while enabling stateless communication protocol, and without deploying on-premise assets or any constraints on the data centers or backends of the organizations.

In some cases, using the multi-tenant encryption scheme, the same encrypted data may be used for multiple single-tenant layers, such as in order to perform a cooperated function. In some cases, a user may attempt to perform an action, such as booking an appointment, that requires cooperation of multiple tenants. For example, such an action may require a first tenant to extract member data of the user, and one or more second tenants to apply a function on the extracted data, and provide a result to the user. In case a cooperated action is determined to be performed for a user, e.g., based on a user interface over which the extending service is executing, the first tenant may provide to the multi-tenant layer encrypted data that is encrypted with its own public key, and in response, the multi-tenant layer may request the first tenant to decrypt the data and re-encrypt the data with a key of the second tenant, thereby ensuring that the second tenant can access the data while preventing the multi-tenant layer or any other uninvolved tenant from eavesdropping or accessing the data.

In some exemplary embodiments, after performing a handshake between tenants, tenants may retain public keys of other tenants, and may utilize them to encrypt data for the other tenants, in case an internal decision within the tenant namespace indicates that the other tenants should have permission to access the data. In some exemplary embodiments, prior to encrypting data for another tenant using the public key of the other tenant, the encrypting tenant may verify that the other tenant is authorized to access the data, e.g., based on communications with a backend of the tenant's organization or EHR system, based on local logic in the tenant's namespace, based on pre-existing authorization records retained in the tenant's namespace, or the like. In some cases, a tenant may retain authorization records that approve to share at least some data with other tenants. For example, the tenant may present a UI interface via which a user or an employee of the tenant's organization may explicitly select tenants for which data access should be at least partially allowed, approved, or the like. In some exemplary embodiments, along with its public key, each tenant may retain its own private key, which may enable it to decrypt data that was encrypted using its public key.

One technical effect of utilizing the disclosed subject matter is creating a multi-tenant extending storage that enables to efficiently retain and handle data of multiple organizations, using the multi-tenant encryption scheme to ensure secure communications. In some exemplary embodiments, the extending storage may enable to integrate multiple data sources and functionalities that are associated with a same patient, in an efficient, swift and secure way, by communicating securely between tenant namespaces using the multi-tenant encryption scheme, and requiring to obtain direct consent from each tenant in order to decrypt sensitive data thereof. The multi-tenant layer may enable multiple EHR systems to communicate with each other, perform cooperative manipulations on sensitive data, or the like, without enabling unauthorized actors to access sensitive data of a user.

Another technical effect of utilizing the disclosed subject matter is enabling organizations with strict compliance regulations to share and access sensitive information securely while keeping all compliance and contractual requirements, and without deploying on-premise assets on its organizations' data centers.

Yet another technical effect of utilizing the disclosed subject matter is enabling a tenant to ensure that access to its sensitive data is only provided to known entities that are authorized thereby. The utilized end-to-end encryption ensures full consent is provided for each sharing of data or functionality, since third party entities can only access data from a first tenant in case the first tenant encrypted the data with a public key of the third-party entities.

Yet another technical effect of utilizing the disclosed subject matter is providing an eco-system that enables to minimize the footprint or complexity of dealing with PHI data, and enables to develop a cross-tenant logic such as the multi-tenant layer. Enabling tenants to use shared resources in the multi-tenant layer can save computation time, encryption time, memory resources, or the like.

Yet another technical effect of utilizing the disclosed subject matter is enabling the extending service to implement and execute extending applications over EHR systems, by utilizing the disclosed extending storage. In some exemplary embodiments, in order to provide additive functionalities or data to a browsed page of an EHR system, it may be necessary for the extending service to retain an extending storage with data from multiple EHR systems of different entities that relate to a same user, and can be used to perform cooperated actions.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 illustrating a flowchart diagram of a method, in accordance with some exemplary embodiments of the disclosed subject matter.

In some exemplary embodiments, the extending storage may comprise a software storage system that may comprise a multi-tenant layer and multiple single-tenant layers. In some exemplary embodiments, the multi-tenant layer may comprise shared resources, e.g., shared logic resources, shared data resources, shared functionalities, shared metadata, shared mappings of data records, or the like, which may be accessible and usable by multiple tenants of the storage system, by the multi-tenant layer itself, by an agent of the multi-tenant layer, or the like. In some exemplary embodiments, the multiple tenants may comprise organizations having respective EHR systems, or any other type of systems, which may each be allocated a single-tenant layer including a private namespace within the multi-tenant layer. In some exemplary embodiments, each single-tenant layer may be associated with a respective tenant, and may comprises a database, business logic, tenant infrastructure, or the like, belonging to the tenant. In some exemplary embodiments, within its single-tenant layer, the tenant may be enabled to manipulate sensitive data from its database, from an obtained input, or the like, using its business logic. In some exemplary embodiments, the multiple single-tenant layers may comprise respective single-tenant namespaces that are comprised within the multi-tenant layer.

In some exemplary embodiments, a multi-tenant encryption scheme may be configured to enable secure communications between the multiple tenants and each other, between a tenant and a user, a combination thereof, or the like. In some exemplary embodiments, in some cases, organizations having a tenant in the extending storage may desire to utilize their own encryption means or methods that are to be integrated by the extending service, e.g., in order to verify that privacy regulations are complied with. In some exemplary embodiments, in addition to the multi-tenant encryption scheme, each tenant may be enabled to implement its own encryption methods within the tenant's namespace.

On Step 110, an encrypted input may be obtained at the multi-tenant layer, e.g., as part of a secure communication between a user and a tenant. For example, the encrypted input may be provided via a client device used by a user, client, or the like. In some exemplary embodiments, the input may comprise a direct user input, an input that is determined based on a user interface of the user, an input that is determined based on information at the client-side, an API call that is associated with a user's activity or display, or the like, all of which may be referred to herein as the user input. In some exemplary embodiments, the user input may indicate or request one or more functions to be performed, and may or may not include one or more arguments or variables for the functions. In some exemplary embodiments, the user input may indicate requested data, metadata, or the like.

In some exemplary embodiments, the user input may comprise one or more encrypted portions, one or more non-encrypted portions, or the like. In some exemplary embodiments, the user may not encrypt data, e.g., in case the data comprises a non-PHI request that does not comprise sensitive data, does not comprise a sensitive context, or the like. For example, the user input may comprise a field indicating whether or not the packet is sensitive, and may not be encrypted in case it is not sensitive. As another example, all inputs may be encrypted. In some exemplary embodiments, the user may encrypt data with one or more public keys, e.g., in case the data comprises sensitive data, a sensitive context, PHI data, or the like. In some exemplary embodiments, each encryption of data with a public key may only enable an entity with a matching private key to access the data, thereby preventing the multi-tenant layer to access such data, preventing the encrypting entity to access the data in case the encrypted entity does not retain the matching private key, or the like.

In some exemplary embodiments, an extending service may be configured to execute one or more extending applications over EHR systems that are being used by a patient, on behalf of the patient, by a user, or the like. For example, upon a user logging in to an EHR system at a user device, an agent of the extending service within the user device may automatically identify the logging in session, and execute one or more extending applications over the EHR pages. In some exemplary embodiments, the extending service may monitor a user interface of the user, and identify relevant extending applications, requests, resources, or the like, that can enhance the service provided to the user and are missing in the current user interface. In some exemplary embodiments, an extending application of the extending service may be configured to push additional content to an EHR page, load resources thereto, provide data or functionalities to the EHR page, or the like, e.g., based on the extending storage. In some exemplary embodiments, the target resources may be determined based on a user input, such as a user using a query to search for doctors, and obtaining a limited list that misses relevant doctors in the area, information about the listed doctors, or the like. Alternatively, the target resources may be determined without a direct user input, such as based on a context of the user interactions, based on missing data in the browsed page, based on an estimated intention of the user, or the like. In some exemplary embodiments, the encrypted input may comprise a request for resources determined with or without direct user input.

In some exemplary embodiments, in case the user input is at least partially sensitive, the user input may be encrypted using a public key of the user. For example, a user-side agent (also referred to as the client of the user) may encrypt the user input using the public key of the user. In some exemplary embodiments, the multi-tenant layer may obtain a user-encrypted user input from the user-side agent, and identify a destination address of a relevant tenant that is configured to process the user input. For example, the multi-tenant layer may identify a tenant that is configured to perform a requested action using the user input, e.g., using one or more shared databases, mappings, or the like, which may be stored in the multi-tenant layer. In some cases, the multi-tenant layer may indicate the destination tenant, a public key thereof, or the like, to the user-side agent, so that the user-side agent will be enabled to re-encrypt the input with the public key of the destination tenant, thereby obtaining a tenant-based encrypted user input that is encrypted with the public key of the destination tenant. In some exemplary embodiments, the multi-tenant layer may enable the user-side agent to re-encrypt the user input with a public key of the destination tenant, which may enable the tenant to access the input data. In some exemplary embodiments, a copy of the public key of the tenant may be already retained by the user, obtained from the multi-tenant layer in response to the user-side agent requesting the public key of the tenant, obtained from the multi-tenant layer at a handshake phase, obtained from the multi-tenant layer in response to any other scenario, or the like.

On Step 120, the encrypted user input may be provided to the tenant, e.g., via the multi-tenant layer. In some exemplary embodiments, the multi-tenant layer may obtain the encrypted user input from the user, and provide or forward the encrypted user input to the tenant.

On Step 130, the encrypted input may be decrypted by the tenant, and processed by the tenant to obtain the tenant's result, response, or the like. In some exemplary embodiments, the tenant may receive the encrypted user input, and decrypt the encrypted user input using a private key of the tenant. The tenant's private key may match the public key of the tenant, with which the user input was encrypted, thereby enabling to extract the user input itself in a non-encrypted form. In some exemplary embodiments, the communicated packets, such as the encrypted user input, that are communicated via the multi-tenant layer, may comprise a field, header, indication, or the like, indicating whether or not the data is encrypted, an entity associated with the public key that was used for the encryption, a public key of the encrypting entity, or the like. In some exemplary embodiments, in case the encrypted input indicates that the data was encrypted with the public key of the tenant, the tenant may decrypt the data using its private key. Alternatively, the received packet may not include indications of the type of encryption, and the tenant may be configured to attempt to decrypt any received packet.

In some exemplary embodiments, after extracting the user input from the packet, the tenant may process the user input, such as by applying thereon one or more functionalities, extracting requested data, or the like, thereby obtaining a result. In some exemplary embodiments, the result may comprise requested data, a requested functionality, a logical execution, a business logic functionality, a result from applying the requested functionality on privately owned data of the tenants, or the like. For example, the user input may request to obtain available schedules, and the tenant may utilize the user input, arguments thereof, or the like, which may indicate user preferences, in combination with privately owned data regarding available schedules matching the user preferences, shared resources, or the like, in order to provide a result.

On Step 140, the result from the tenant may be encrypted by the tenant with a public key of the tenant prior to providing the result to a next tenant, to a user, to the multi-tenant layer, or the like, thereby obtaining an encrypted version of the result. Alternatively, a public key of the destination may be used to encrypt the result, e.g., a public key of a user, a target tenant, or the like. In some exemplary embodiments, it may be advantageous to configure each tenant to encrypt the result with its own public key, even if the public key of the next destination is known and available, at least since the encrypted output, when encrypted with the public key of the next destination, can be used for multiple next destinations simultaneously.

In some exemplary embodiments, the encrypted result may be provided to a next destination, e.g., a next tenant or a user. Alternatively, the encrypted result may be provided to the multi-tenant layer. In some exemplary embodiments, the tenant or the multi-tenant layer may determine a next destination of the result based on whether or not data is needed from a next tenant, whether or not the result complies with the user request, or the like. In some exemplary embodiments, although the multi-tenant layer may not have access to the encrypted data, it may have access to metadata thereof, such as a name of a function that is performed by each tenant, a type of functionality that is requested, a type of data that can be extracted from a tenant, functionality mappings and dependencies of the tenants, non-encrypted data, or the like. In some exemplary embodiments, upon sending the encrypted result to a destination, the receiving party receiving the encrypted result may determine that the encrypted result cannot be accessed, and request from the tenant to re-encrypt the result using a public key of the destination entity.

On Step 150, the result may be re-encrypted by the tenant, to obtain a re-encrypted version of the result with a different encryption. In some exemplary embodiments, the encrypted result may be re-encrypted according to the public key of the destination entity from which data or logic are desired to be obtained, to which the result is intended, or the like. For example, the target entity may comprise a second tenant, a user, or the like. In some exemplary embodiments, in response to the re-encryption request from the target entity or the multi-tenant layer, the tenant may determine whether or not the target entity should have permission to access the encrypted data. In some exemplary embodiments, in case access is determined to be granted, the tenant may decrypt the result with its private key, and re-encrypt the result with a second public encryption key of the destination entity, after which only the destination entity is enabled to access the result. In some exemplary embodiments, in case the tenant does not retain a copy of the public key of the destination entity, the tenant may request the public key from the destination entity via the multi-tenant layer, obtain the public key via the re-encryption request, or the like.

In some exemplary embodiments, in case the target entity is a second tenant, the public encryption key of the target entity with which the result is re-encrypted may comprise a public key of a second tenant, e.g., if the second tenant is determined by the tenant to be qualified or authorized for accessing the result, and in case the second tenant is vital for completing the task. In some exemplary embodiments, the re-encrypted result may be provided to the second tenant directly or via the multi-tenant layer, and the method flow may return to Step 120, this time applying to the second tenant instead of the original tenant. In some cases, the method flow may flow iteratively from Step 150 to Step 120 and back, until the target entity becomes the user, thereby enabling the flow to continue to Step 160.

As an example of the scenario in which the target entity comprises another tenant, a first data record regarding the user may be retained in a database of the tenant, and a second data record regarding the user may be retained in a database of the second tenant. In some exemplary embodiments, the tenant may process the user input by retrieving the first data record from the database of the tenant. In some exemplary embodiments, the tenant may encrypt the first data record with its own public key, and provide the encrypted result to the second tenant. In some exemplary embodiments, the second tenant may be configured to issue an encryption replacement request to the tenant with the encrypted result, thereby enabling the tenant to re-encrypt the first data record with the public key of the second tenant, e.g., without relying on a local storage of the tenant. In some exemplary embodiments, after obtaining from the tenant a re-encrypted version of the first data record, the second tenant may decrypt the re-encrypted result using a private key of the second tenant, thereby obtaining the result. In some exemplary embodiments, the second tenant may process the first data record, together with the second data record, which may be retrieved from the database of the second tenant. In some exemplary embodiments, the second tenant may determine a second result based on the first and second data records, functionalities applied thereon, or the like. In some cases, the second tenant may provide the second result to the multi-tenant layer, to be provided to a user-side client of the user, which may utilize the second result to provide a display to the user. In some cases, the multi-tenant layer may provide the second result to any other entity, e.g., to a next tenant.

Alternatively, in case the target entity comprises the user, the re-encrypted result may be re-encrypted with a public key of the user, e.g., in case the result is designated to the user, in case the result complies with the request of the user, or the like. In some exemplary embodiments, the encrypted result may be re-encrypted by the tenant according to the public key of the user, thereby enabling only the user to access the result. In some exemplary embodiments, in such a scenario, the re-encrypted result may be provided to the user via the multi-tenant layer, and the method flow may continue to Step 160.

In some exemplary embodiments, in any stage of the method, the multi-tenant layer itself, or an agent thereof, logic thereof, or the like, may perform one or more processing steps of non-encrypted data, inputs, results, or the like, such as using shared logic resources, shared data resources, or the like. For example, the multi-tenant layer may perform processing steps in order to determine a next destination entity. In some exemplary embodiments, the result from the processing of the multi-tenant layer may be combined with one or more encrypted results from tenants, may be provided to one or more tenants, may be provided as an argument of a target functionality, may be provided separately to the user, or the like.

On Step 160, the re-encrypted result may be provided to the user. In some exemplary embodiments, only the user may retain the user's private key, thus preventing any other entity from accessing the data. In some exemplary embodiments, providing a result to the user may comprise providing the result to an extending application that is presented to the user, providing the result to an agent of the user, or the like.

In some exemplary embodiments, in an alternative scenario, such as in case the user input is non-sensitive, e.g., comprising a non-PHI request that requests non-sensitive data or functionality, the multi-tenant layer may obtain the user input in a non-encrypted form, and process the request without encryptions. In some exemplary embodiments, the multi-tenant layer may process the request using shared logic resources, shared data resources, or the like, and return to the user a non-sensitive result that is not encrypted. In some exemplary embodiments, in case the multi-tenant layer does not have resources to fulfil the request, the multi-tenant layer may identify a tenant that can fulfil the request, and provide the request in its non-encrypted form to the selected tenant, who may output a non-sensitive result in a non-encrypted form that can be returned to the user.

Figure 2:
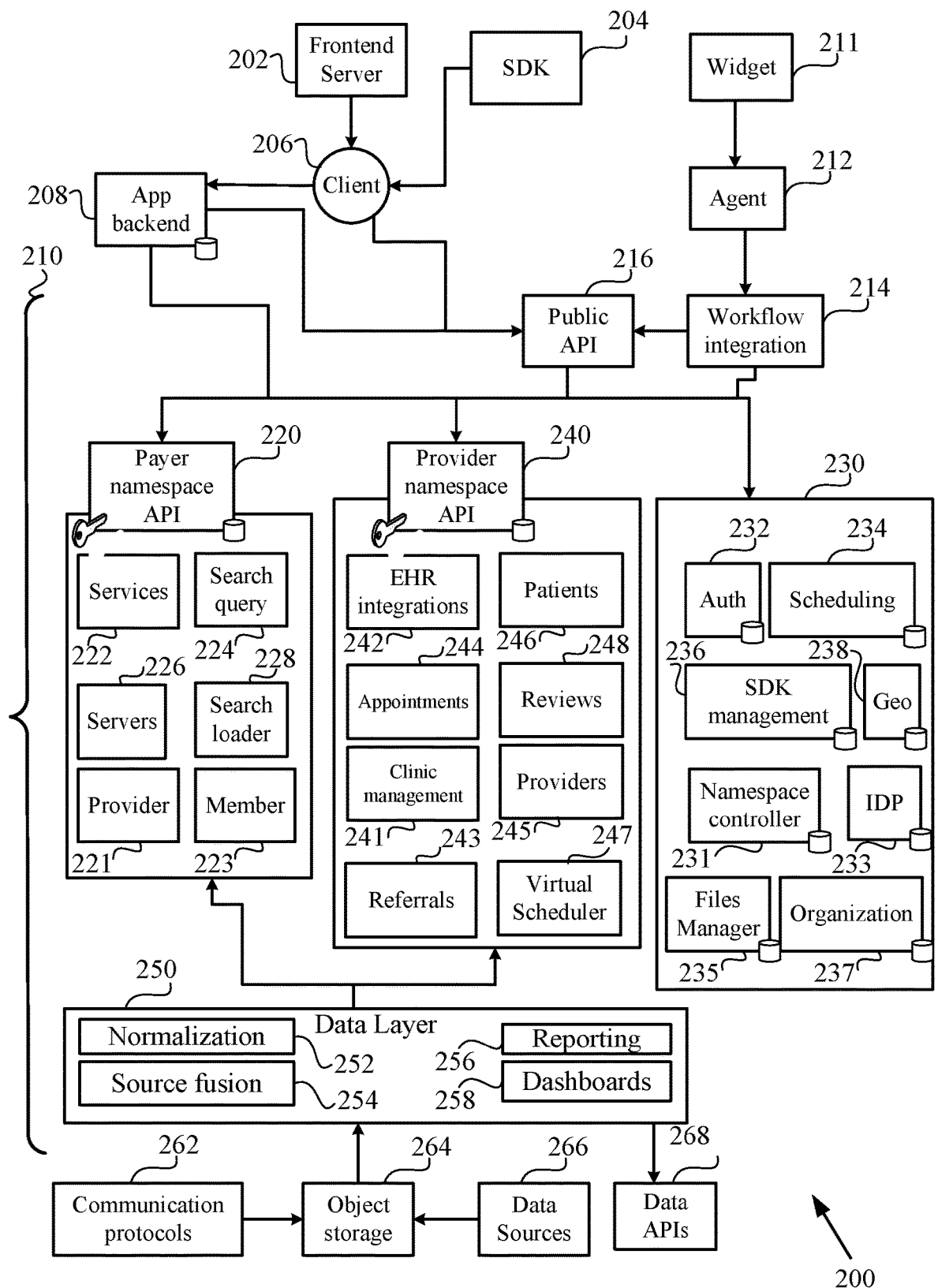
FIG. 2 shows a schematic illustration of an exemplary environment in which the disclosed subject matter may be utilized, in accordance with some exemplary embodiments of the disclosed subject matter.

Referring now to FIG. 2 showing a schematic illustration of an exemplary environment, in accordance with some exemplary embodiments of the disclosed subject matter.

Environment 200 comprises an exemplary architecture of a multi-tenant environment that comprises an Extending Storage 210. In some exemplary embodiments, Extending Storage 210 may comprise a Multi-Tenant Layer 230 with shared resources, shared data, shared logic, or the like, which may be used by all tenants of Extending Storage 210 and by Multi-Tenant Layer 230 itself. In some exemplary embodiments, Extending Storage 210 may comprise single-tenant layers, namespaces, or the like, such as Payer Namespace API 220, which may comprise multiple namespaces of payers, and Provider Namespace API 240, which may comprise multiple namespaces of providers, or any other namespaces.

In some exemplary embodiments, the single-tenant layers, such as Payer Namespace API 220 and Provider Namespace API 240, may each retain sensitive and/or non-sensitive data of the tenant, and may output sensitive data or results in an encrypted form only, without enabling any tenant to access the sensitive data without obtaining an approval from the tenant in the form of an associated encryption. In some exemplary embodiments, Extending Storage 210 may enable its tenants to securely implement one or more functions, actions, extending applications, or the like, over various EHR systems using their sensitive PHI data.

In some exemplary embodiments, Environment 200 may comprise a Client 206, such as a user-side software agent of a patient, a caretaker on behalf of a patient, or the like, which may be rendered by Frontend Server 202. In some exemplary embodiments, Client 206 may desire to access or view one or more extending applications such as via Widget 211, including augmented information, additional functionalities, or the like. For example, Client 206 may browse an EHR page of an EHR system communicating with Application Backend 208 (denoted 'App backend'), and may desire to obtain additional options that are not provided by the EHR system, e.g., ratings of providers, actions such as booking an appointment with additional providers, or the like. An Agent 212 of an extending service, including a browser extension, a desktop agent, or the like, may be executed over the EHR system and utilize Workflow Integration 214 and Public API 216 as APIs to the Extending Storage 210. In some cases, Workflow Integration 214 may comprise a module with business logic for the agents to use such as by adding Widget 211 with extending functionalities over the EHR system. In some exemplary embodiments, Public API 216 and Workflow Integration 214 may comprise shared sub-modules that can be used by any tenant.

In some exemplary embodiments, in order to configure and generate the extending functionalities, Extending Storage 210 may be utilized in order to extract resources that can be used to generate the extending functionalities and integrate them into the workflow. In some exemplary embodiments, based on inputs from Client 206, user interfaces of the EHR system, or the like, a request for Extending Storage 210 may be determined, e.g., by a Software Development Kit (SDK) 204. In some exemplary embodiments, SDK 204 may comprise a JavaScript SDK or any other SDK in any other programming language, compilation status, or the like, which may be executed on the client-side and monitor the user interface of the EHR system. In some exemplary embodiments, SDK 204 may generate the request to include one or more desired actions, data entries, or the like, that are desired to be obtained from Extending Storage 210. In some exemplary embodiments, SDK 204 may be configured to classify portions of the request as sensitive or not, and encrypt one or more sensitive portions of the request, such as using a public key of Client 206.

In some exemplary embodiments, Multi-Tenant Layer 230 may obtain the request that was generated by SDK 204, e.g., via Public API 216, Workflow Integration 214, or the like, and in case it comprises one or more non-encrypted portions, determine whether or not resources of Multi-Tenant Layer 230 can be used to complete one or more requested tasks. In case it can, Multi-Tenant Layer 230 may utilize one or more resources of Multi-Tenant Layer 230 in order to complete one or more requested tasks or portions thereof. In some exemplary embodiments, requests and parameters provided to the Multi-Tenant Layer 230 may not necessarily be encrypted, e.g., in case they are not sensitive. In such cases, Multi-Tenant Layer 230 may process the data by itself, transfer the data to relevant tenants without using encryptions, or the like. In other cases, Multi-Tenant Layer 230 may utilize its resources for determining target tenants that are to be utilized for performing the tasks.

Multi-Tenant Layer 230 may comprise resources such as Authentication 232 (denoted 'Auth'), Scheduling 234, SDK Management 236, Namespace Controller 231, Geo-locations 238 (denoted 'Geo'), Organization 237, Identity Provider (IDP) 233, Files Manager 235, or the like. In some cases, the resources of Multi-Tenant Layer 230 may comprise one or more orchestrating modules for facilitating or implementing one or more capabilities of Multi-Tenant Layer 230. In some exemplary embodiments, Authentication 232 may comprise a module that is configured to authenticate users. In some exemplary embodiments, Scheduling 234 may be configured to orchestrate tasks regarding scheduling features of the extending service, such as bookings. In some cases, Scheduling 234 may schedule cooperated tasks between tenants, e.g., based on metadata, tenants' functionalities' mappings, or the like. In some exemplary embodiments, SDK Management 236 may be configured to manage UI components such as SDK 204, such as by indicating thereto the multi-tenant encryption protocol for communication with tenants, how to generate requests, how to encrypt sensitive information, or the like. In some exemplary embodiments, Namespace Controller 231 may be configured to manage and control namespaces of different tenants, entities, or the like, such as by allocating new namespaces for new tenants, removing namespaces, or the like. In some exemplary embodiments, Namespace Controller 231 may allocate for every customer, provider, tenant, or the like, a namespace that uniquely identifies the tenant and its components within Multi-Tenant Layer 230, and is automatically created. In some exemplary embodiments, Namespace Controller 231 may be responsible for provisioning all needed infrastructure for a tenant within its namespace, including one or more databases, message queues, infrastructure for utilizing security protocols, or the like. In some exemplary embodiments, Geo-locations 238 may be configured to transform addresses to geolocations, to determine time zones for specific locations, or the like. In some exemplary embodiments, Organization 237 may be configured to manage or retain data and metadata of organizations having tenants in Extending Storage 210, such as privacy settings of each organization that are implemented within the tenant's namespace, licensing of each organization, monetary issues of each organization, data access permissions of each organization, or the like. In some cases, Organization 237 may configure encryption keys for the organizations, may establish permission lists or other relations between tenants of the organizations, may retain subscription tiers of the organizations, or any other tenant configurations that may be relevant in a Software as a Service (SaaS) system. In some exemplary embodiments, IDP 233 may comprise an identity provider that may be configured to create, maintain, and manage identity information of users that are registered to the extending service. For example, IDP 233 may retain credentials for the user accounts, which may be used by Authentication 232 to authenticate a user account. Files Manager 235 may be configured to manage non-sensitive files of the tenants, contracts therewith, or the like. In some exemplary embodiments, Files Manager 235 may manage one or more types of sensitive files without accessing them, such as by obtaining or determining metadata about the files, locations of the files, an identifier of a user uploading the files, or the like. In some exemplary embodiments, Files Manager 235 may manage the interface with file uploads systems such as Amazon™ Web Services (AWS), Simple Storage Service (S3), or the like, via which files may be uploaded.

In some exemplary embodiments, in case Multi-Tenant Layer 230 cannot fulfil one or more portions of the request, Multi-Tenant Layer 230 may assign or detect one or more tenants that are configured to perform the remaining task, micro-services thereof, or the like, e.g., using Scheduling 234. In some exemplary embodiments, the selected tenants may comprise one or more provider tenants from Provider Namespace API 240, one or more payer tenants from Payer Namespace API 220, a combination thereof, or the like. In some exemplary embodiments, Multi-Tenant Layer 230 may forward a request with encrypted data and potentially with a public key of Client 206 to a first tenant of the determined schedule. In some cases, the request may also contain the entire schedule of the request, portions thereof, or the like.

In some exemplary embodiments, each payer tenant of Payer Namespace API 220 may comprise sub-modules such as Services 222, Server 226, Provider 221, Search Query 224, Search Loader 228, Member 223, or the like which may be utilized by a payer entity such as a medical insurance company. In some exemplary embodiments, the sub-modules of a tenant may or may not include PHI data. In some exemplary embodiments, Services 222 and Server 226 may comprise one or more services provided by the tenant, one or more servers thereof, or the like. Provider 221 may comprise data associated with providers who work with that payer, ranking of the providers, their specialties (from the point of view of the payer), the supported insurance plans of the providers, or the like. Search Query 224 and Search Loader 228 may comprise a search engine that enables to search and analyze a database of the payer, e.g., the Provider 221 database of supported providers that work with the payer, the Services 222, or the like. Search Loader 228 may load the search engine and Search Query 224 may perform queries. Member 223 may comprise an eligibility API that can indicate for each member which providers are supported by the payer, whether or not a certain provider is supported for the member, policy conditions, financial issues such as a remaining deductible, care gaps, diagnostic gaps, risk related metrics, a list of services that are included in the member's insurance plan, or any other type of information that the payer can provide regarding its members.

In some exemplary embodiments, in case the client request is provided to a tenant of Payer Namespace API 220, the tenant may utilize one or more of its sub-modules in order to perform the requested task. In some exemplary embodiments, the tenant may decrypt the data of the request using its private key, in case it is encrypted, after which one or more processes may be performed. For example, in case the task comprises identifying providers for a member of the payer tenant that wishes to book an appointment, Search Loader 228 and Search Query 224 may be utilized in order to search for a record of the member, using member data, and extracting associated providers.

In some cases, the request may or may not be provided to a provider tenant. In some exemplary embodiments, each tenant of Provider Namespace API 240 may comprise sub-modules such as EHR Integrations 242, Appointments 244, Clinic Management 241, Referrals 243, Patients 246, Reviews 248, Provider 245, Virtual Scheduler 247, or the like, which may be utilized by a provider entity such as a medical center, a hospital, a clinic, a private doctor, or the like. In some exemplary embodiments, the sub-modules of Provider Namespace API 240 may or may not retain PHI data.

In some exemplary embodiments, a provider tenant may comprise sub-modules such as Provider 245, which may comprise general data of the provider, such as a list of its employees (doctors), a specialty of each employee such as her field of specialization, clinics to which each employee belongs, a payer of each physician, payers with which a provider works, or the like. This data could be represented differently in various payer tenants. Clinic Management 241 may comprise a component with metadata regarding a clinic of the provider, such as an identifier of the clinic, a location of the clinic, employees of the clinic, specialties of the clinic, specialties of clinic employees, or the like. Patients 246 may comprise data that identifies user accounts or user records of the EHR systems. The user accounts may include patient credentials, patient data, account data from the extending storage, or the like. Referrals 243 may comprise generated referrals that belong to members, patients, or the like, e.g., active or historic. Each referral can be associated with a member, for which the referral is generated, an appointment object, or the like. In some exemplary embodiments, Appointments 244 may comprise a storage of all appointment records of the provider, e.g., of one or more clinics. Each appointment record may include one or more properties, fields, or the like, such as participants of the appointment, the role of the participants in the appointment, a topic of the appointment, a reason for the appointment, a date of the appointment, an entity that scheduled the appointment, related costs, or the like. Reviews 248 may comprise reviews regarding physicians of the provider, clinics of the provider, feedback regarding payers with which the provider works, general feedback from members, or the like. Reviews 248 may comprise review records which may contain one or more free text fields in which reviews can be retained, one or more defined rating fields, or the like.

In some exemplary embodiments, a provider tenant may comprise sub-modules such as EHR Integrations 242, which may comprise an API or interface information of one or more EHR systems that are used by the provider. Virtual Scheduler 247 may comprise a component that can connect to the EHR systems of the provider and automatically interact with the user interface of the EHR system instead of a user, mimicking user interactions with the EHR system, in order to perform actions such as booking appointments. In some cases, Virtual Scheduler 247 may launch a new browser window or tab to perform an action such as booking an appointment for a user. Alternatively, Virtual Scheduler 247 may communicate with a backend of the EHR systems in order to schedule one or more appointments.

In some cases, it might be difficult to classify tenants as provider tenants or payer tenants, at least since some organizations may comprise hybrid entities of both. For example, some entities may retain medical data without being payers or providers, some entities may be hybrid affiliations that are both a payer and a provider, or the like. In such cases, sub-components of each tenancy type may be selected according to its needs. In some exemplary embodiments, data and functionality components of a tenant may be customized according to the tenant's needs.

In some exemplary embodiments, in case the request is provided to a tenant of Provider Namespace API 240, the tenant may utilize one or more of its sub-modules in order to perform the requested task. In some exemplary embodiments, the tenant may decrypt the data of the request using its private key, in case it is encrypted, after which one or more processes or business logic may be performed. For example, in case the task comprises scheduling an appointment for a user, the tenant may utilize Virtual Scheduler 247 in order to schedule the appointment.

In some exemplary embodiments, upon completing a required task, the provider or payer tenant may encrypt the result using their own public key, and forward the encrypted result to one or more next entities in the scheduled task, e.g., another payer tenant, another provider tenant, Client 206, or the like. In some exemplary embodiments, in order to decrypt the data, each receiving entity may need to ask access permission from the sending tenant, by requesting the sending tenant to re-encrypt the data using the receiving entity's public key. In some exemplary embodiments, the sending tenant may only consent to re-encrypt the data in case the sending tenant grants access permission to the receiving entity using one or more internal privacy methods, communications with a backend of the tenant's organization, or the like. In some exemplary embodiments, the process of encrypting and re-encrypting the data may be performed iteratively, until all sub-tasks are completed, and a completed result may be provided to Client 206.

In some exemplary embodiments, in order to update Extending Storage 210 with up-to-date data from multiple EHR systems of tenants, Extending Storage 210 may utilize a Data Layer 250 component. In some exemplary embodiments, Data Layer 250 may obtain data from backends of EHR systems using one or more communication protocols of Communication Protocol 262 such as the Secure Shell Protocol (SSH) File Transfer Protocol. In some exemplary embodiments, Data Layer 250 may obtain data from one or more Object Storages 264 such as AMAZON™ Simple Storage Service, from Data Sources 266, from Data APIs 268, or the like. In some exemplary embodiments, data from Data Layer 250 may be provided, for example, to sub-modules of provider tenants such as the Provider 245 sub-module, to sub-modules of payer tenants such as the Provider 221 and Member 223 sub-modules, or the like.

In some exemplary embodiments, Data Layer 250 may process obtained data using one or more sub-modules such as Normalization 252, Source Fusion 254, Reporting 256, Dashboards 258, or the like. In some exemplary embodiments, Normalization 252 may be configured to normalize or convert data obtained from multiple sources into a unified or standard form. Source Fusion 254 may be configured to fuse together non-sensitive data from one or more sources, e.g., in order to utilize the data in Multi-Tenant Layer 230, in other tenants, or the like. Reporting 256 may be used to reflect or report operation metrics of the system to a customer, such as a system usage metric that may be defined per provider, a system usage metric that may be defined per member, a file of all objects of a certain type over a defined timeframe, or the like. For example, Reporting 256 may enable to extract a list of all appointments that were scheduled during the last week, or any other elapsed time. Reporting 256 may be configured to report any issues of the system to EHR systems of the tenants, to infrastructure vendors, or the like. Dashboards 258 may comprise dashboards enabling operators of the extending service to estimate the status of the extending storage, to view updates, or the like.

Figure 3:
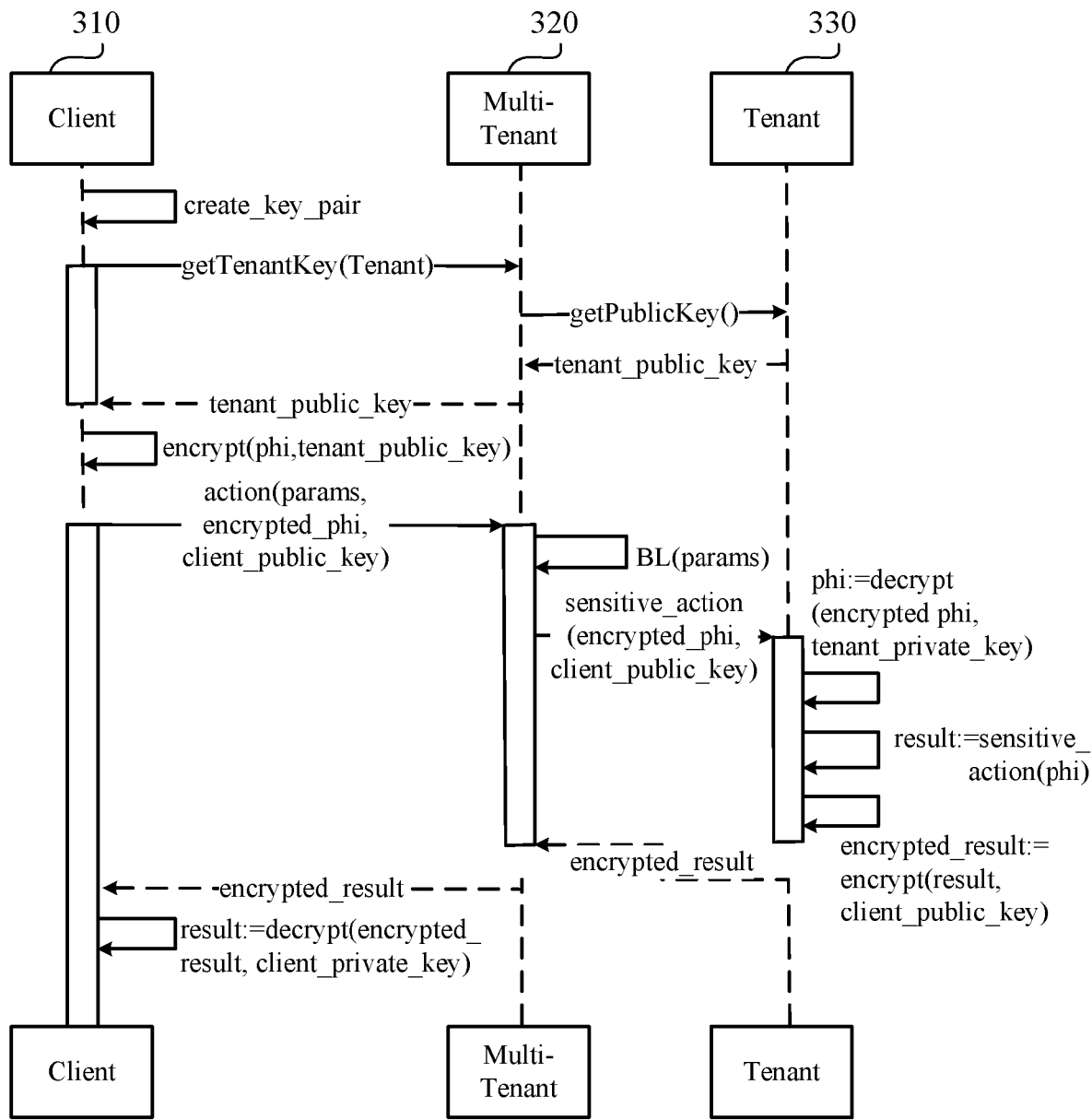
FIG. 3 shows a schematic illustration of an exemplary data flow, in accordance with some exemplary embodiments of the disclosed subject matter.

Referring now to FIG. 3 showing a schematic illustration of an exemplary data flow, in accordance with some exemplary embodiments of the disclosed subject matter.

In some exemplary embodiments, a Client 310 may comprise a software client-side agent of a user such as a patient, a caretaker on behalf of the patient, an insured user, or the like. In some exemplary embodiments, data of Client 310, such as medical records thereof, may be retained at one or more tenants of the extending storage, such as at a Tenant 330. In some exemplary embodiments, the extending storage may comprise the backend of the extending service, a portion thereof, or the like, which may retain namespaces for tenants of various types such as provider tenants, payer tenants, hybrid affiliations, or the like. In some exemplary embodiments, all tenants of all types may not have access to each other's private data and logic, e.g., data and logic retained in each tenant's namespace. In some exemplary embodiments, Multi-Tenant 320 may comprise a multi-tenant layer that is accessible by all tenants, and may be utilized as a secure communication medium. In some exemplary embodiments, Multi-Tenant 320 may not have access to encryptions of tenants with which Multi-Tenant 320 communicates. Multi-Tenant 320 may be enabled to schedule tasks between tenants, communicate encrypted and non-encrypted data between entities, communicate public keys between entities, apply business logic on non-encrypted data, or the like, without being able to decrypt encrypted data or access its content.

In some exemplary embodiments, the multi-tenant encryption scheme used by the tenants and users may utilize one or more encryption schemes such as an asymmetric cryptography, a symmetric cryptography, or any other encryption scheme. In some exemplary embodiments, the data encryption may utilize an asymmetric cryptography that uses pairs of keys: public keys and public keys. In some exemplary embodiments, a key pair comprising a public key and a private key may be generated by each participant based on a one-way function, hash, or based on any other function or mathematical calculation. In some exemplary embodiments, in each key pair, the public key may be used to encrypt data, while the private key may be used to decrypt data that was encrypted with the matching public key. In some exemplary embodiments, every tenant may retain in its namespace a database, business logic, and an encryption key pair that is unique to the tenant and is automatically created, thereby creating a single-tenant namespace.

In some exemplary embodiments, Client 310 may obtain or create a key pair, including a public key of Client 310 that may be publicly available or providable, and a private key of Client 310 that may be retained at Client 310 alone, e.g., at its allocated namespace, at a user-side agent, or the like. In some exemplary embodiments, based on one or more actions or EHR user interfaces presented to Client 310, a request may be generated to request one or more actions to be performed, data to be retrieved, or the like. The request may be determined or derived from Client 310's user interface, from user interactions therewith, or the like.

In some exemplary embodiments, Tenant 330 may obtain or create a key pair, including a public key of Tenant 330 that may be publicly available, and a private key of Tenant 330 that may be retained at Tenant 330 alone. In some exemplary embodiments, Tenant 330 may be needed in order to perform the request of Client 310, e.g., as may be determined by Multi-Tenant 320. In some exemplary embodiments, in case the public key of Tenant 330 is not available to Client 310, which may be the initial case, Client 310 may attempt to acquire the public key of Tenant 330, in order to encrypt sensitive data and provide it discretely to Tenant 330 as part of a secure communication. In some exemplary embodiments, Client 310 may request the public key of Tenant 330 from Multi-Tenant 320. Multi-Tenant 320 may forward the request from Client 310 to Tenant 330, and obtain the public key of Tenant 330 from Tenant 330, from shared resources retained by Multi-Tenant 320, or the like. Multi-Tenant 320 may forward the obtained public key of Tenant 320 to Client 310, thereby enabling Client 310 to encrypt sensitive data, such as PHI data, with the received public key, without any entity except Tenant 330 being able to decrypt such data.

In some exemplary embodiments, Client 310 may generate a request message including one or more encrypted sensitive PHI data, which may be required for performing the requested action, with the public key of Tenant 330. In some exemplary embodiments, Client 310 may generate the request message to include one or more non-sensitive portions that may or may not be encrypted, such as a required action that is non-sensitive, non-sensitive parameters, a public key of Client 310, or the like. Client 310 may send the request message to Multi-Tenant 320, requesting one or more tasks such as a required action, a required retrieval of data, or the like, which may or may not include non-sensitive sub-tasks, non-sensitive tasks, or the like. In some exemplary embodiments, prior to sending the request to Multi-Tenant 320, Client 310 may decide whether or not Tenant 330 should have permission to access the encrypted data, and encrypt data for tenants only in case the tenants are determined to have access permissions. The decision may be performed dynamically, based on defined rules, heuristics, or the like.

In some exemplary embodiments, Multi-Tenant 320 may receive the request message from Client 310, and in case the message includes non-encrypted data, Multi-Tenant 320 may determine whether or not it retains resources for implementing associated tasks. In case resources are located, Multi-Tenant 320 may execute one or more functions or business logic using the non-encrypted portions of the request, such as the one or more non-sensitive parameters of the request. In some exemplary embodiments, Multi-Tenant 320 may forward the request message, a portion thereof, or the like, to Tenant 330. For example, the forwarded request may include the encrypted sensitive data and a public key of Client 310. In some exemplary embodiments, the request to Tenant 330 may or may not exclude data is not relevant for the target function of Tenant 330, such as the non-sensitive data that can be manipulated by Multi-Tenant 320, non-sensitive data that is not estimated to be needed for a functionality that is intended to be provided by Tenant 330, or the like.

In some exemplary embodiments, Tenant 330 may decrypt the encrypted sensitive data using the private key of Tenant 330, which matched the public key with which the sensitive data was encrypted, to thereby extract the sensitive data itself. Tenant 330 may subsequently perform the requested action using the sensitive data that was decrypted, such as implementing business logic therewith, manipulating the data, retrieving associated data, or the like. After performing the requested action, Tenant 330 may encrypt the result of the action with the public key of Tenant 330, and then re-encrypt the result with a public key of Client 310, as was attached to the request message. For example, Client 310 or Multi-Tenant 320 may request the Tenant 330 to re-encrypt the result with the public key of Client 310. Tenant 330 may retain the public key of Client 310 for any future communications, or discard the public key to release memory.

In some exemplary embodiments, Tenant 330 may forward the encrypted result, which is encrypted with the public key of Client 310, to Multi-Tenant 320. Multi-Tenant 320 may not be enabled to access the result data, since Multi-Tenant 320 may not retain the private key of Client 310. Multi-Tenant 320 may forward the encrypted result to Client 310, in its encrypted form. Client 310 may retain its own private key, enabling it to decrypt the encrypted result and access the result data. For example, the resulting functionality may be augmented to a user interface of an EHR system, such as by rendering it via a client-side agent in an inline frame (iframe).

Figure 4:
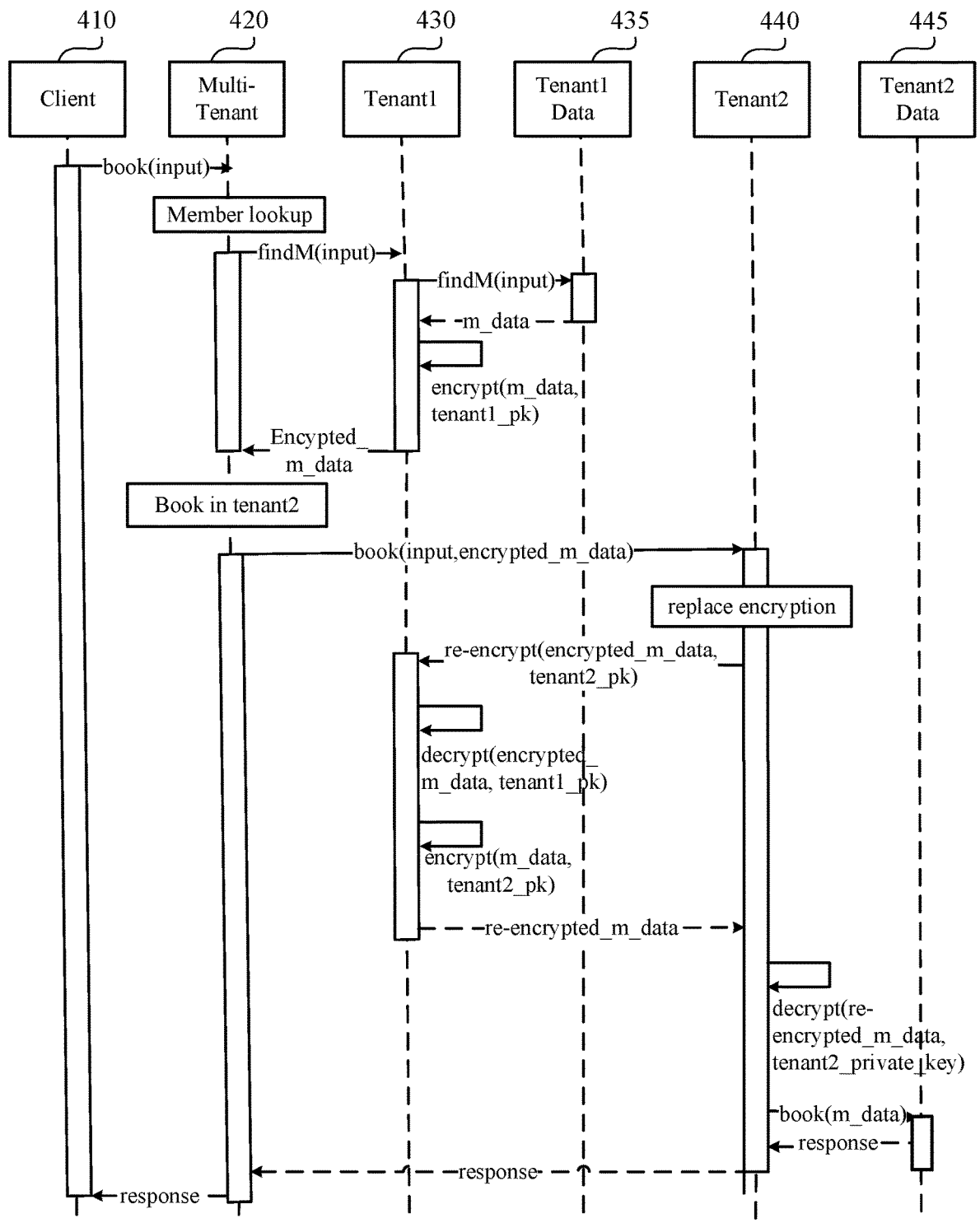
FIG. 4 shows a schematic illustration of an exemplary data flow, in accordance with some exemplary embodiments of the disclosed subject matter.

Referring now to FIG. 4 showing a schematic illustration of an exemplary data flow, in accordance with some exemplary embodiments of the disclosed subject matter.

In some exemplary embodiments, Client 410 may correspond to Client 310 (FIG. 3), Multi-Tenant 420 may correspond to Multi-Tenant 320 (FIG. 3), and Tenant 430 (denoted Tenant1) may correspond to Tenant 330 (FIG. 3), In some exemplary embodiments, Tenant Data 435 may correspond to a database and logic of Tenant 430 that are retained within its namespace. In some exemplary embodiments, Tenant 440 (denoted Tenant2) may comprise a separate tenant of the extending storage that is different from Tenant 430, includes a same of different type of tenant, has different data and business logic, or the like. Tenant Data 445 may comprise a database and logic of Tenant 440 that are retained within its namespace.

In some exemplary embodiments, Client 410 may request to perform a cooperated action that requires cooperation of two or more tenants, e.g., Tenant 430 and Tenant 440. For example, the cooperated action may include a booking action that requires Tenant 430 for performing a member identification of Client 410, extracting its supported providers, and Tenant 440 for booking an appointment for an identified provider of the member. In some exemplary embodiments, Client 410 may wish to book an appointment, e.g., with a physician, a caretaker, or the like. For example, Client 410 may intend to book an appointment with a doctor listed in the database of Tenant 440, which may comprise a provider entity. However, Tenant 430 may comprise a payer entity that can identify for each member of the payer, which providers are insured thereby. Both tenants may be required for performing the desired booking.

In some exemplary embodiments, Client 410 may send a booking request to Multi-Tenant 420, requesting Multi-Tenant 420 to book an appointment according to one or more inputs such as an identifier of the patient, a type of appointment, a target time range, or the like, which may or may not be encrypted. In some exemplary embodiments, the request may comprise the requested action in a non-encrypted form, e.g., the requested booking action, and non-sensitive inputs in a non-encrypted form. In some exemplary embodiments, the request may or may not comprise one or more sensitive user inputs, parameters, or the like, such as a sensitive user identifier, in an encrypted form that is encrypted with Client 410's public key.

In some exemplary embodiments, Multi-Tenant 420 may obtain the request, and determine a task schedule, first scheduling Tenant 430 that is required for identifying and extracting the member data of Client 410, and subsequently scheduling Tenant 440 for performing the booking. Any other number of tenants can be scheduled. In some exemplary embodiments, in order to book the treatment for the member with the provider, member information may be required to be searched for at a payer tenant, e.g., Tenant 430, since payer tenants may retain data regarding to insurance programs of insured accounts. In some exemplary embodiments, after determining the schedule, indicating that Tenant 430 is the current destination, Multi-Tenant 420 may indicate the public key of Tenant 430 to Client 410, in order to enable Client 410 to encrypt any sensitive data for Tenant 430. In response, Multi-Tenant 420 may obtain from Client 410 a re-encrypted input that is encrypted with the public key of Tenant 430.

In some exemplary embodiments, after obtaining the re-encrypted input from Client 410, Multi-Tenant 420 may request Tenant 430 to lookup or find the member data (denoted 'm_data') or account data of Client 410 within Tenant 430's namespace. In some cases, the member data may indicate an insurance program of Client 410, supported providers, or the like. In some exemplary embodiments, the request with the encrypted data that is provided to Tenant 430 may comprise an encrypted version of the user's input, a public key of Client 410, non-sensitive user parameters that are not encrypted, or the like. In order to lookup the requesting member data, Tenant 430 may decrypt the encrypted input using its private key, and extract the user input, e.g., a user identifier, therefrom. Tenant 430 may forward the decrypted data to Tenant Data 435, which may retain the database and logic of Tenant 430. In some exemplary embodiments, the data search in Tenant Data 435 may be implemented using a "find member" functionality, or using any other API call or functionality over the database. Tenant Data 435 may look up the information of Client 410 based on the input, and extract from the database member data of Client 410. In some exemplary embodiments, the member data may comprise sensitive data associated with the member, such as health insurance plan, finances, or the like. In some exemplary embodiments, in case a record with member data of Client 410 is not located in Tenant Data 435, such as in case Client 410 is not a member of Tenant 430's health plan, Tenant 430 may indicate that no member data was found, e.g., in a non-encrypted form, in an encrypted form using the public key of Tenant 430, or the like.

In some exemplary embodiments, in case the member data is identified and extracted from Tenant Data 435, Tenant Data 435 may forward the data to Tenant 430, and Tenant 430 may encrypt the member data using its own public key (denoted 'tenant1_pk'). In some exemplary embodiments, it may be advantageous to configure each tenant to first encrypt the data with its own public key, even if the public key of the next destination is known and available, at least since this enables the tenant to have full control of the access permissions to the data and enables to forward the same encrypted data to multiple next destinations simultaneously, with a simple protocol. For example, Tenant 430 may provide encrypted member data, and the encrypted member data may be provided to multiple provider entities in order to identify all of the available timeslots for an appointment. The provider tenants may each request re-encryption of the data from the payer tenant.

In some exemplary embodiments, the encrypted member data may be forwarded to Multi-Tenant 420. In some exemplary embodiments, from the perspective of Multi-Tenant 420, the encrypted member data is a closed envelope that cannot be opened, without having access to its encrypted content or encryption type. Multi-Tenant 420 may not have access to the member data itself, but nevertheless may have access to metadata of the message, such as to its schedule, its task, a category of the data, the fact that the message includes an encrypted version of the member data, or the like. Based on the metadata of the message, scheduling data, or the like, Multi-Tenant 420 may determine that Tenant 440 is scheduled next and is required for completing the cooperated action, e.g., for utilizing the member data in order to book an appointment for Client 410.

In some exemplary embodiments, Multi-Tenant 420 may send the encrypted member data to Tenant 440, e.g., in response to determining that Tenant 440 is the next destination. In some exemplary embodiments, Tenant 440 may obtain the encrypted member data, and determine that it is encrypted with a public key that does not match its private key, e.g., based on an indication in the request, based on failing to decrypt the data, or the like. In some exemplary embodiments, Tenant 440 may determine that a re-encryption of the data is needed. In some exemplary embodiments, Tenant 440 may request a re-encryption of the data from the previous tenant, e.g., Tenant 430, directly or via Multi-Tenant 420. In case Tenant 440 does not know what public key was used for the encryption, Tenant 440 may inquiry Multi-Tenant 420 for the former tenant or return the data to Multi-Tenant 420, who may request a re-encryption from the former tenant, e.g., Tenant 430. Alternatively, Tenant 440 may directly request Tenant 430 to re-encrypt the data with a public key of Tenant 440. For example, the request for re-encryption may introduce the requesting tenant, include the encrypted data, request for access or permissions from the former tenant, and provide a public key of the requesting tenant or indication thereof.

In some exemplary embodiments, Tenant 430 may obtain the re-encryption request, decrypt the data using its private key, and decide whether or not Tenant 440 is trusted for access permission to the data, should be enabled to access the member data, or the like, e.g., dynamically, based on heuristics, based on user policies, or the like. In case permission is granted to Tenant 440 by Tenant 430, Tenant 430 may re-encrypt the member data this time using the public key of Tenant 440 (denoted 'tenant2_pk'), which may be included in the re-encrypting request. Tenant 430 may provide the re-encrypted member data to Tenant 440, now with an encryption that matches the private key of Tenant 440.

In some exemplary embodiments, Tenant 440 may be enabled to decrypt the re-encrypted member data using its private key, thereby extracting the member data from the booking request. In some exemplary embodiments, after extracting the member data, Tenant 440 may forward the booking request with the decrypted member data to Tenant Data 445, which may perform the requested booking of the appointment, such as using the input from the user and the member data, and return a response or result to Tenant 440. The response may include data regarding the booked appointment, such as a location thereof, a doctor with which the appointment was made, a clinic with which the appointment was made, or the like. In some exemplary embodiments, Tenant 440 may encrypt the result using its own public key, and forward the response to Multi-Tenant 420, which may forward the response to Client 410, and request Tenant 440 to re-encrypt the result with a public key of Client 410.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A software storage system comprising a processor and coupled memory, said memory comprising:
   a multi-tenant layer that comprises shared resources, wherein the shared resources are accessible to multiple tenants of the storage system, wherein the shared resources comprise shared logic resources and shared data resources; and
   multiple single-tenant layers, wherein each single-tenant layer is associated with a respective tenant of the multiple tenants, wherein each single-tenant layer comprises a database and business logic of the respective tenant;
   wherein said processor is adapted to implement a multi-tenant encryption scheme, wherein the multi-tenant encryption scheme is configured to enable secure communications with the multiple tenants without divulging sensitive information to the multi-tenant layer,
   wherein the processor is adapted to implement a secure communication comprising:
      obtaining, at the multi-tenant layer, an encrypted input to be provided to a tenant, wherein the encrypted input is encrypted with a public key of the tenant,
      providing the encrypted input to the tenant,
      decrypting, at the tenant, the encrypted input using a private key of the tenant, thereby obtaining the input,
      processing, at the tenant, the input, thereby obtaining a result,
      encrypting, at the tenant, the result with a public key of the tenant, thereby obtaining an encrypted result,
      providing the encrypted result, via the multi-tenant layer, to a destination entity,
      in response to an encryption replacement request from the destination entity, decrypting the encrypted result, at the tenant, using the private key of the tenant, and re-encrypting the result with a public key of the destination entity, thereby obtaining a re-encrypted result, and
      providing the re-encrypted result to the destination entity, whereby the multi-tenant layer has no access to the input and to the result.

2. The system of claim 1,
   wherein the destination entity is a second tenant of the multiple tenants,
   wherein the input is a user input of a user provided via a client device,
   wherein a first data record about the user is retained in the database of the tenant and a second data record about the user is retained in the database of the second tenant,
   wherein said processing the input at the tenant comprises the tenant retrieving the first data record from the database of the tenant,
   wherein the second tenant is configured to issue the encryption replacement request to the tenant with the encrypted result, thereby enabling the tenant to perform said re-encrypting without relying on a local storage of the tenant,
   wherein the second tenant is further configured to:
      decrypt the re-encrypted result using a private key of the second tenant, thereby obtaining the result;
      retrieve the second data record from the database of the second tenant;
      process the result with the second data record to determine a second result; and
      provide the second result to the multi-tenant layer, to be provided to a client of the user, enabling the client to utilize the second result to provide a display to the user.

3. The system of claim 1, wherein the secure communication comprises:
   obtaining, at the multi-tenant layer, a request from a user requesting the public key of the tenant,
   providing, at the multi-tenant layer, the public key of the tenant to the user, and
   encrypting, at the user, the input with the public key of the tenant, thereby obtaining the encrypted input.

4. The system of claim 1, wherein the secure communication comprises:
   obtaining, at the multi-tenant layer, non-encrypted data in addition to the encrypted input, wherein the non-encrypted data comprises non-sensitive data,
   processing, at the multi-tenant layer, the non-encrypted data based on the shared logic resources and the shared data resources, thereby obtaining a non-encrypted result, and
   providing, at the multi-tenant layer, the non-encrypted result to a user.

5. The system of claim 1, wherein the secure communication comprises:
   obtaining, at the multi-tenant layer, non-encrypted data in addition to the encrypted input, wherein the non-encrypted data comprises non-sensitive data,
   providing the non-encrypted data to the tenant, in addition to the encrypted input,
   processing, at the tenant, the non-encrypted data, thereby obtaining a non-encrypted result, and
   providing, at the tenant, the non-encrypted result to the multi-tenant layer.

6. The system of claim 1, wherein said re-encrypting is performed based on a determination of the tenant that the destination entity has permission to access the result.

7. The system of claim 1, wherein the destination entity comprises a second tenant, whereby the second tenant is enabled to decrypt the re-encrypted result using a private key of the second tenant.

8. The system of claim 1, wherein the destination entity comprises the user, whereby the user is enabled to decrypt the re-encrypted result using a private key of the user.

9. The system of claim 1, wherein the multiple single-tenant layers comprise respective namespaces that are contained within the multi-tenant layer.

10. The system of claim 1, wherein the multiple tenants comprise respective Electronic Health Record (EHR) systems.

11. The system of claim 1, wherein the multiple tenants comprise a first tenant and a second tenant, wherein the first tenant complies with a first security or privacy restriction and wherein the second tenant complies with a second security or privacy restriction.

12. The system of claim 11, wherein the first security or privacy restriction is contradictory to the second security or privacy restriction.

13. An apparatus comprising a processor and coupled memory, said processor being adapted to implement a multi-tenant encryption scheme, wherein the multi-tenant encryption scheme is configured to enable secure communications with multiple tenants of a software storage system without divulging sensitive information to a multi-tenant layer of the storage system, wherein the processor is adapted to:
    obtain, at the multi-tenant layer, an encrypted input to be provided to a tenant, wherein the encrypted input is encrypted with a public key of the tenant, wherein the multi-tenant layer comprises shared resources, wherein the shared resources are accessible to the multiple tenants of the storage system, wherein the shared resources comprise shared logic resources and shared data resources;
    provide the encrypted input to the tenant, wherein the tenant comprises a single-tenant layer of multiple single-tenant layers of the storage system, wherein each single-tenant layer is associated with a respective tenant of the multiple tenants, wherein each single-tenant layer comprises a database and business logic of the respective tenant;
    decrypt, at the tenant, the encrypted input using a private key of the tenant, thereby obtaining the input;
    process, at the tenant, the input, thereby obtaining a result;
    encrypt, at the tenant, the result with a public key of the tenant, thereby obtaining an encrypted result;
    provide the encrypted result, via the multi-tenant layer, to a destination entity;
    in response to an encryption replacement request from the destination entity, decrypt the encrypted result, at the tenant, using the private key of the tenant, and re-encrypt the result with a public key of the destination entity, thereby obtaining a re-encrypted result; and
    provide the re-encrypted result to the destination entity, whereby the multi-tenant layer has no access to the input and to the result.

14. The apparatus of claim 13,
    wherein the destination entity is a second tenant of the multiple tenants,
    wherein the input is a user input of a user provided via a client device,
    wherein a first data record about the user is retained in the database of the tenant and a second data record about the user is retained in the database of the second tenant,
    wherein said process the input at the tenant comprises the tenant retrieving the first data record from the database of the tenant,
    wherein the second tenant is configured to issue the encryption replacement request to the tenant with the encrypted result, thereby enabling the tenant to perform said re-encrypting without relying on a local storage of the tenant,
    wherein the second tenant is further configured to:
        decrypt the re-encrypted result using a private key of the second tenant, thereby obtaining the result;
        retrieve the second data record from the database of the second tenant;
        process the result with the second data record to determine a second result; and
        provide the second result to the multi-tenant layer, to be provided to a client of the user, enabling the client to utilize the second result to provide a display to the user.

15. The apparatus of claim 13, wherein the multi-tenant encryption scheme comprises:
    obtaining, at the multi-tenant layer, a request from a user requesting the public key of the tenant,
    providing, at the multi-tenant layer, the public key of the tenant to the user, and
    encrypting, at the user, the input with the public key of the tenant, thereby obtaining the encrypted input.

16. The apparatus of claim 13, wherein the multi-tenant encryption scheme comprises:
    obtaining, at the multi-tenant layer, non-encrypted data in addition to the encrypted input, wherein the non-encrypted data comprises non-sensitive data,
    processing, at the multi-tenant layer, the non-encrypted data based on the shared logic resources and the shared data resources, thereby obtaining a non-encrypted result, and
    providing, at the multi-tenant layer, the non-encrypted result to a user.

17. The apparatus of claim 13, wherein the multi-tenant encryption scheme comprises:
    obtaining, at the multi-tenant layer, non-encrypted data in addition to the encrypted input, wherein the non-encrypted data comprises non-sensitive data,
    processing, at the multi-tenant layer, the non-encrypted data based on the shared logic resources and the shared data resources, thereby obtaining a non-encrypted result, and
    providing, at the multi-tenant layer, the non-encrypted result to a second tenant of the multiple tenants.

18. The apparatus of claim 13, wherein the multi-tenant encryption scheme comprises:
    obtaining, at the multi-tenant layer, non-encrypted data in addition to the encrypted input, wherein the non-encrypted data comprises non-sensitive data,
    providing the non-encrypted data to the tenant, in addition to the encrypted input,
    processing, at the tenant, the non-encrypted data, thereby obtaining a non-encrypted result, and
    providing, at the tenant, the non-encrypted result to the multi-tenant layer.

19. The apparatus of claim 13, wherein said re-encrypting is performed based on a determination of the tenant that the destination entity has permission to access the result.

20. A computer program product comprising a non-transitory computer readable medium retaining program instructions, which program instructions when read by a processor, cause the processor to implement a multi-tenant encryption scheme, wherein the multi-tenant encryption scheme is configured to enable secure communications with multiple tenants of a software storage system without divulging sensitive information to a multi-tenant layer of the storage system, wherein the program instructions, when executed by the processor, cause the processor to:
    obtain, at the multi-tenant layer, an encrypted input to be provided to a tenant, wherein the encrypted input is encrypted with a public key of the tenant, wherein the multi-tenant layer comprises shared resources, wherein the shared resources are accessible to the multiple tenants of the storage system, wherein the shared resources comprise shared logic resources and shared data resources;

provide the encrypted input to the tenant, wherein the tenant comprises a single-tenant layer of multiple single-tenant layers of the storage system, wherein each single-tenant layer is associated with a respective tenant of the multiple tenants, wherein each single-tenant layer comprises a database and business logic of the respective tenant;

decrypt, at the tenant, the encrypted input using a private key of the tenant, thereby obtaining the input;

process, at the tenant, the input, thereby obtaining a result;

encrypt, at the tenant, the result with a public key of the tenant, thereby obtaining an encrypted result;

provide the encrypted result, via the multi-tenant layer, to a destination entity;

in response to an encryption replacement request from the destination entity, decrypt the encrypted result, at the tenant, using the private key of the tenant, and re-encrypt the result with a public key of the destination entity, thereby obtaining a re-encrypted result; and provide the re-encrypted result to the destination entity, whereby the multi-tenant layer has no access to the input and to the result.

\* \* \* \* \*